US012620331B2

(12) United States Patent
Kim et al.

(10) Patent No.: US 12,620,331 B2
(45) Date of Patent: May 5, 2026

(54) DISPLAY DEVICE DISPLAYING A THREE-DIMENSIONAL IMAGE

(71) Applicant: Samsung Display Co., LTD., Yongin-si (KR)

(72) Inventors: Hyomin Kim, Yongin-si (KR); Gi-Na Yoo, Yongin-si (KR); Sang Min Hong, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 19/019,763

(22) Filed: Jan. 14, 2025

(65) Prior Publication Data

US 2026/0024476 A1 Jan. 22, 2026

(30) Foreign Application Priority Data

Jul. 17, 2024 (KR) ........................ 10-2024-0094121

(51) Int. Cl.
| | |
|---|---|
| *H04N 13/327* | (2018.01) |
| *G09G 3/00* | (2006.01) |
| *H04N 13/302* | (2018.01) |
| *H04N 13/366* | (2018.01) |
| *H04N 13/398* | (2018.01) |
| *G09G 3/32* | (2016.01) |

(52) U.S. Cl.
CPC .............. *G09G 3/007* (2013.01); *G09G 3/03* (2020.08); *H04N 13/302* (2018.05); *H04N 13/327* (2018.05); *H04N 13/366* (2018.05); *H04N 13/398* (2018.05); *G09G 3/32* (2013.01); *G09G 2320/0209* (2013.01); *G09G 2380/10* (2013.01); *H04N 2213/002* (2013.01)

(58) Field of Classification Search
CPC ........... G09G 3/007; G09G 3/03; G09G 3/32; G09G 2320/0209; G09G 2380/10; H04N 13/302; H04N 13/327; H04N 13/366; H04N 13/398; H04N 2213/002
See application file for complete search history.

(56) References Cited

U.S. PATENT DOCUMENTS

| | | | | |
|---|---|---|---|---|
| 4,395,234 A | * | 7/1983 | Shenker | ................. B82Y 15/00 |
| | | | | 434/33 |
| 5,320,534 A | * | 6/1994 | Thomas | ................. G09B 9/307 |
| | | | | 348/121 |
| 5,421,589 A | * | 6/1995 | Monroe | ............... H04N 13/346 |
| | | | | 348/E13.058 |

(Continued)

FOREIGN PATENT DOCUMENTS

KR 100685398 B1 2/2007

*Primary Examiner* — Temesghen Ghebretinsae
*Assistant Examiner* — K. Kiyabu
(74) *Attorney, Agent, or Firm* — CANTOR COLBURN LLP

(57) ABSTRACT

A display device includes a display panel including a first display region, and a second display region positioned at a predetermined angle with respect to the first display region, an optical module which reflects light emitted from the first display region, and transmits light emitted from the second display region, and a panel driver which drives the display panel, where the panel driver performs a pixel shift operation in a way such that first and second images respectively displayed in the first and second display regions are shifted in opposite directions along a first direction, and are shifted in a same direction along a second direction substantially perpendicular to the first direction.

19 Claims, 19 Drawing Sheets

(56) References Cited

U.S. PATENT DOCUMENTS

| | | | | |
|---|---|---|---|---|
| 6,703,988 B1* | 3/2004 | Fergason | | H04N 13/337 |
| | | | | 356/124.5 |
| 2006/0114171 A1* | 6/2006 | Vascotto | | G09B 9/02 |
| | | | | 345/1.1 |
| 2006/0145942 A1* | 7/2006 | Maatta | | G02B 5/045 |
| | | | | 345/1.3 |
| 2006/0268407 A1* | 11/2006 | Fergason | | H04N 13/346 |
| | | | | 359/485.02 |
| 2007/0159602 A1* | 7/2007 | Fergason | | G03B 35/18 |
| | | | | 359/464 |
| 2007/0176848 A1* | 8/2007 | Ferren | | G06F 3/1446 |
| | | | | 353/94 |
| 2007/0285663 A1* | 12/2007 | Hewitt | | H04N 13/398 |
| | | | | 356/399 |
| 2008/0231689 A1* | 9/2008 | Larson | | H04N 13/39 |
| | | | | 348/E13.055 |
| 2011/0164120 A1* | 7/2011 | Ha | | G02B 30/25 |
| | | | | 348/51 |
| 2015/0243199 A1* | 8/2015 | Lee | | G09G 3/3648 |
| | | | | 345/691 |
| 2016/0018663 A1* | 1/2016 | Kim | | G02B 30/50 |
| | | | | 359/479 |
| 2016/0180789 A1* | 6/2016 | Hur | | G09G 3/3614 |
| | | | | 345/100 |
| 2016/0343354 A1* | 11/2016 | Noh | | G09G 5/38 |
| 2018/0068603 A1* | 3/2018 | Noh | | G09G 3/2092 |
| 2019/0025580 A1* | 1/2019 | Nagano | | G02B 27/01 |
| 2019/0035157 A1* | 1/2019 | Chung | | G02B 27/0101 |
| 2019/0324271 A1* | 10/2019 | Lee | | G02B 27/286 |
| 2021/0264830 A1* | 8/2021 | Lee | | G09G 3/2092 |
| 2023/0124178 A1* | 4/2023 | Heshmat Dehkordi | | |
| | | | | G02B 30/56 |
| | | | | 359/1 |
| 2024/0004215 A1* | 1/2024 | Dehkordi | | G02B 30/25 |

* cited by examiner

PSA DR1

IMG1

LD

BL

LD

IMG2

PSA

DR2 BR(BDAT)

DISPLAY DEVICE DISPLAYING A THREE-DIMENSIONAL IMAGE

This application claims priority to Korean Patent Application No. 10-2024-0094121, filed on Jul. 17, 2024, and all the benefits accruing therefrom under 35 U.S.C. § 119, the content of which in its entirety is herein incorporated by reference.

BACKGROUND

1. Field

Embodiments of the invention relate to a display device, and more particularly to a display device that displays a three-dimensional image.

2. Description of the Related Art

In general, a stereoscopic image display device may display a three-dimensional image using binocular parallax by providing different images to left and right eyes of a user. However, there is a problem that the user may feel dizzy if the user continuously watches the three-dimensional image displayed using the binocular parallax.

Recently, a display device that does not use that binocular parallax but uses display panels positioned at different distances from a user to display a three-dimensional image has been developed. In such a display device, the user may feel depth perception (or stereoscopic perception) based on the difference in distance or focal length of the display panels.

SUMMARY

Some embodiments provide a display device capable of displaying a three-dimensional image and performing a pixel shift operation without image distortion.

According to embodiments, there is provided a display device including a display panel including a first display region, and a second display region positioned at a predetermined angle with respect to the first display region, an optical module which reflect slight emitted from the first display region, and transmits light emitted from the second display region, and a panel driver which drives the display panel, where the panel driver performs a pixel shift operation in a way such that first and second images respectively displayed in the first and second display regions are shifted in opposite directions along a first direction, and are shifted in a same direction along a second direction substantially perpendicular to the first direction.

In embodiments, the display panel may be bent in a way such that the first display region and the second display region are substantially perpendicular to each other, and the optical module may include a beam splitter including an inclined surface, where to the beam splitter divides light emitted from each of the first and second display regions and incident on the inclined surface into reflected light and transmitted light.

In embodiments, the reflected light of the first display region, which is emitted from the first display region and is reflected from the inclined surface of the beam splitter, may be provided to a user, and the transmitted light of the second display region, which is emitted from the second display region and transmits through the inclined surface of the beam splitter, may be provided to the user.

In embodiments, the first direction may be a direction substantially perpendicular to a boundary line between the first display region and the second display region, and the second direction may be an extending direction of the boundary line between the first display region and the second display region.

In embodiments, the first direction may be a scan direction in which scan signals are sequentially output, and the second direction may be an extending direction of each of scan lines through which the scan signals are transferred.

In embodiments, the panel driver may shift a first image displayed in the first display region in an up direction by a pixel shift amount, and may shift the second image displayed in the second display region in a down direction by the pixel shift amount.

In embodiments, the panel driver may generate interpolated data by interpolating image data for a lowermost pixel row in the first display region and image data for an uppermost pixel row in the second display region, and the display panel may display an image based on the interpolated data in a blank region between the first image and the second image when the first image and the second image are shifted.

In embodiments, the display panel may display a black image in a blank region between the first image and the second image when the first image and the second image are shifted.

In embodiments, the panel driver may shift the first image displayed in the first display region in a down direction by a pixel shift amount, and may shift the second image displayed in the second display region in an up direction by the pixel shift amount.

In embodiments, the display panel may display a black image in an overlap region where the first image and the second image overlap.

In embodiments, the panel driver may generate average data of image data for the first and second display regions with respect to an overlap region, and the display panel may display an image based on the average data in the overlap region where the first image and the second image overlap when the first image and the second image are shifted.

In embodiments, the display panel may display a black image in a blank region at a top of the first display region, and may display a black image in a blank region at a bottom of the second display region when the first image and the second image are shifted.

In embodiments, the panel driver may shift the first image displayed in the first display region in a left direction by a pixel shift amount, and may shift the second image displayed in the second display region in the left direction by the pixel shift amount.

In embodiments, the panel driver may shift the first image displayed in the first display region in a right direction by a pixel shift amount, and may shift the second image displayed in the second display region in the right direction by the pixel shift amount.

In embodiments, the panel driver may include a direction information storing unit which stores information about the first direction and the second direction, a region information storing unit which stores information about the first display region and the second display region, a pixel shift amount storing unit which stores information about a pixel shift amount of the pixel shift operation, and a pixel shift processing unit which performs the pixel shift operation, and generates image data for a blank region or an overlap region generated by the pixel shift operation.

In embodiments, the first direction may be an extending direction of each of scan lines included in the display panel, and the second direction may be a scan direction in which scan signals are sequentially output through the scan lines.

In embodiments, the display panel may further include a third display region facing the first display region, and positioned substantially perpendicular to the second display region. In such embodiments, light emitted from the third display region may be reflected from an inclined surface of the optical module, may move toward the second display region, may be reflected again from the second display region, and may be provided to a user by being transmitted through the inclined surface of the optical module.

In embodiments, the panel driver may shift a third image displayed in the third display region such that the first and third images are shifted in opposite directions along the first direction, the second and third images are shifted in a same direction along the first direction, and the first, second and third images are shifted in a same direction along the second direction.

According to embodiments, there is provided a display device including a display panel including a first display region and a second display region, where the display panel is bent in a way such that the first display region and the second display region are substantially perpendicular to each other, an optical module including an inclined surface, where the optical module reflects light emitted from the first display region on the inclined surface, and transmits light emitted from the second display region on the inclined surface, and a panel driver which drives the display panel, where the panel driver performs a pixel shift operation. In such embodiments, when a first image displayed in the first display region is shifted in an up direction, the panel driver shifts a second image displayed in the second display region in a down direction. In such embodiments, when the first image is shifted in the down direction, the panel driver shifts the second image in the up direction. In such embodiments, when the first image is shifted in a left direction, the panel driver shifts the second image in the left direction. In such embodiments, when the first image is shifted in a right direction, the panel driver shifts the second image in the right direction.

According to embodiments, there is provided a display device including a display panel including a first display region, a second display region and a third display region, where the display panel is bent in a way such that the first display region and the third display region face each other and the second display region is substantially perpendicular to each of the first display region and the third display region, an optical module including an inclined surface, where the optical module divides light emitted from each of the first, second and third display regions and incident on the inclined surface into reflected light and transmitted light, and a panel driver which drives the display panel, where the panel driver performs a pixel shift operation. In such embodiments, when a first image displayed in the first display region is shifted in an up direction, the panel driver shifts a second image displayed in the second display region in a down direction, and shifts a third image displayed in the third display region in the down direction. In such embodiments, when the first image is shifted in the down direction, the panel driver shifts the second image in the up direction, and shifts the third image in the up direction. In such embodiments, when the first image is shifted in a left direction, the panel driver shifts the second image in the left direction, and shifts the third image in the left direction. In such embodiments, when the first image is shifted in a right direction, the panel driver shifts the second image in the right direction, and shifts the third image in the right direction.

According to embodiments, there is provided an electronic device including a processor configured to provide input image data, a display panel including a first display region, and a second display region positioned at a predetermined angle with respect to the first display region, an optical module which reflects light emitted from the first display region, and transmits light emitted from the second display region; and a panel driver which receives the input image data from the processor, and drives the display panel based on the input image data. The panel driver performs a pixel shift operation in a way such that first and second images respectively displayed in the first and second display regions are shifted in opposite directions along a first direction, and are shifted in a same direction along a second direction substantially perpendicular to the first direction.

In embodiments, the display panel may be bent in a way such that the first display region and the second display region are substantially perpendicular to each other, and the optical module may include a beam splitter including an inclined surface, where to the beam splitter divides light emitted from each of the first and second display regions and incident on the inclined surface into reflected light and transmitted light.

In embodiments, the reflected light of the first display region, which is emitted from the first display region and is reflected from the inclined surface of the beam splitter, may be provided to a user, and the transmitted light of the second display region, which is emitted from the second display region and transmits through the inclined surface of the beam splitter, may be provided to the user.

In embodiments, the first direction may be a direction substantially perpendicular to a boundary line between the first display region and the second display region, and the second direction may be an extending direction of the boundary line between the first display region and the second display region.

In embodiments, the first direction may be a scan direction in which scan signals are sequentially output, and the second direction may be an extending direction of each of scan lines through which the scan signals are transferred.

In embodiments, the panel driver may shift a first image displayed in the first display region in an up direction by a pixel shift amount, and may shift the second image displayed in the second display region in a down direction by the pixel shift amount.

As described above, in a display device according to embodiments, a display panel may be bent in a way such that a first display region and a second display region have a predetermined angle therebetween. An optical module may reflect light emitted from the first display region, and may transmit light emitted from the second display region. Accordingly, the display device according to embodiments may display a three-dimensional image.

Further, in the display device according to embodiments, a panel driver may perform a pixel shift operation such that first and second images respectively displayed in the first and second display regions are shifted in opposite directions along a first direction and are shifted in the same direction along a second direction perpendicular to the first direction. Accordingly, in the display device that displays the three-dimensional image according to embodiments, the pixel shift operation may be effectively performed without image distortion.

BRIEF DESCRIPTION OF THE DRAWINGS

Illustrative, non-limiting embodiments will be more clearly understood from the following detailed description in conjunction with the accompanying drawings.

FIG. 7 is a diagram for describing still another example of a pixel shift operation performed in a display device according to embodiments.

FIG. 8 is a diagram for describing still another example of a pixel shift operation performed in a display device according to embodiments.

FIG. 10 is a block diagram illustrating a display device according to embodiments.

DETAILED DESCRIPTION

Figure 1:
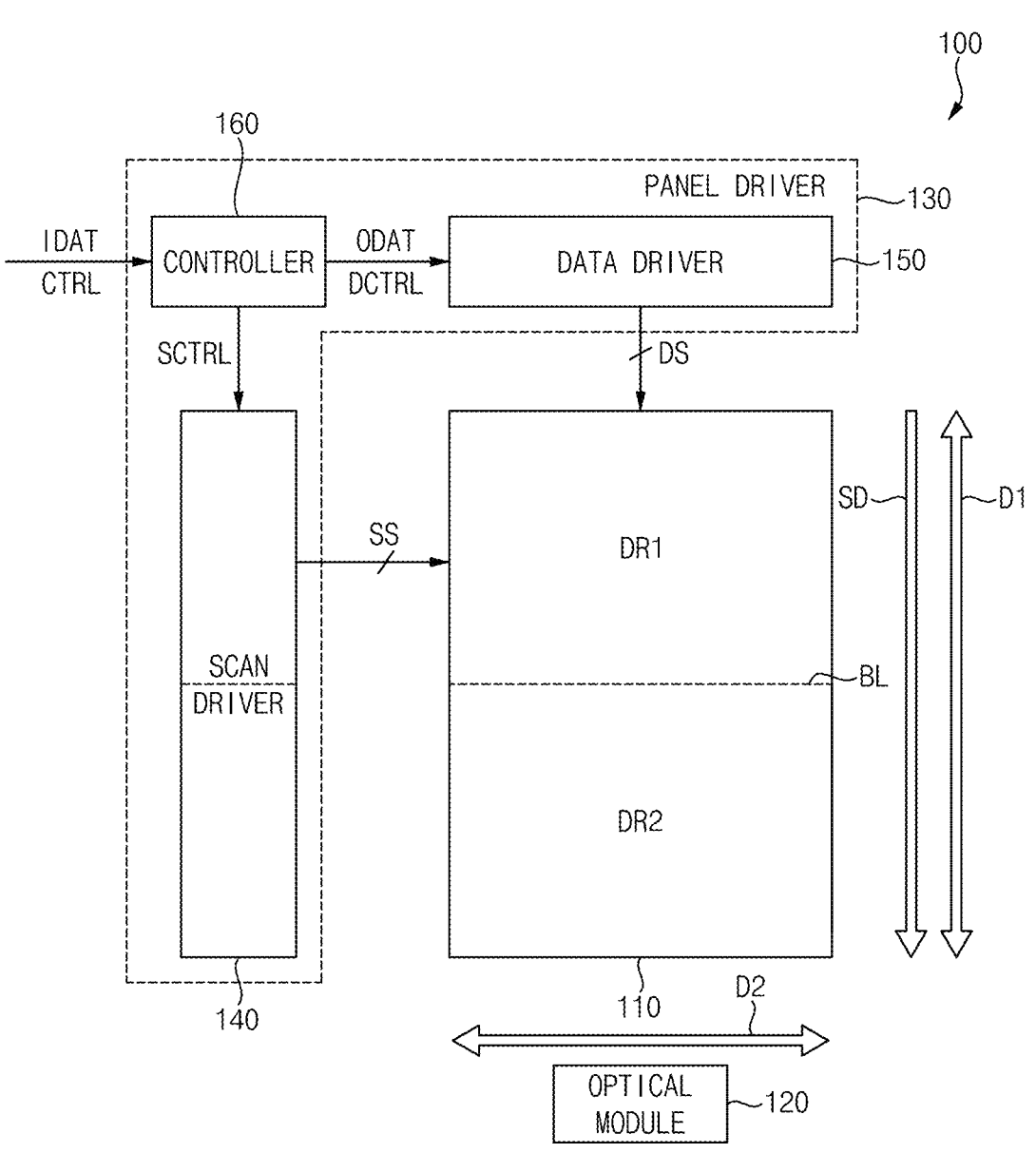
FIG. 1 is a block diagram illustrating a display device according to embodiments.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. Thus, reference to "an" element in a claim followed by reference to "the" element is inclusive of one element and a plurality of the elements. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described in detail with reference to the accompanying drawings. Like or similar reference numerals refer to like or similar elements throughout.

Figure 2:
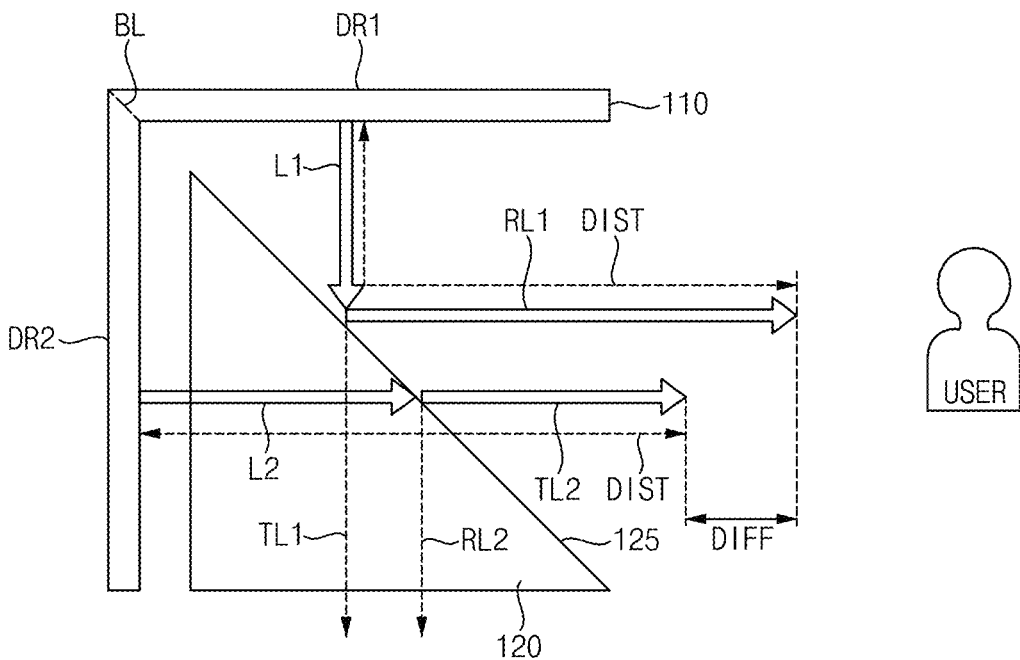
FIG. 2 is a diagram illustrating a display panel and an optical module according to embodiments.
Figure 3A:
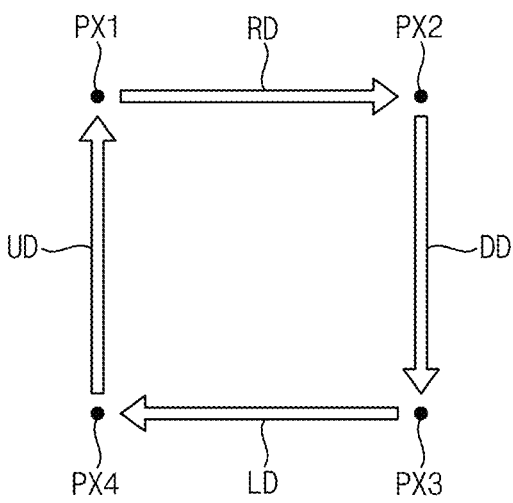
FIG. 3A and FIG. 3B are diagrams for describing examples of a pixel shift operation performed in a display device according to embodiments.
Figure 3B:
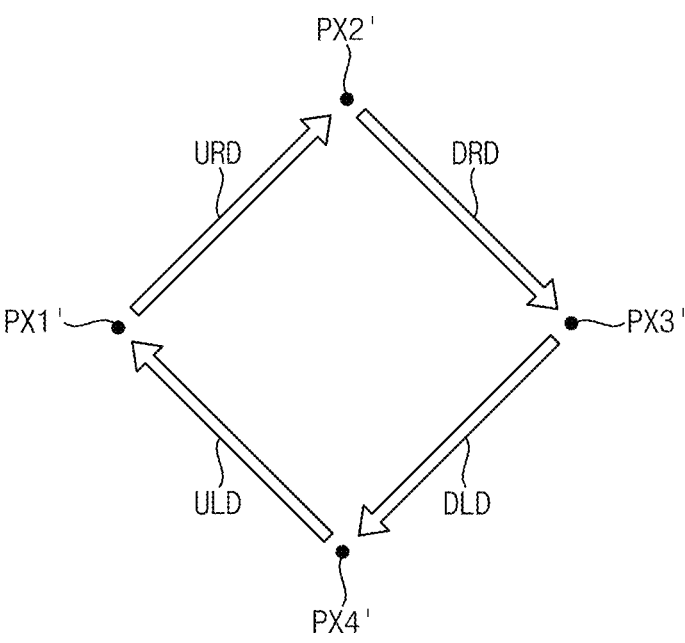
Figure 4A:
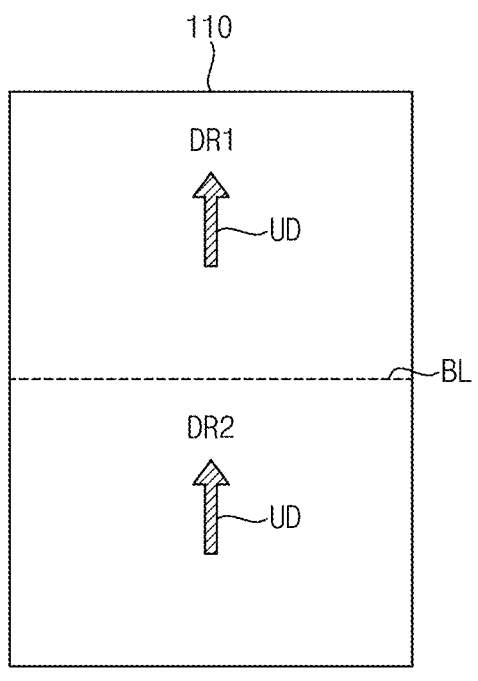
FIG. 4A and FIG. 4B are diagrams for describing an example of a conventional pixel shift operation.
Figure 4B:
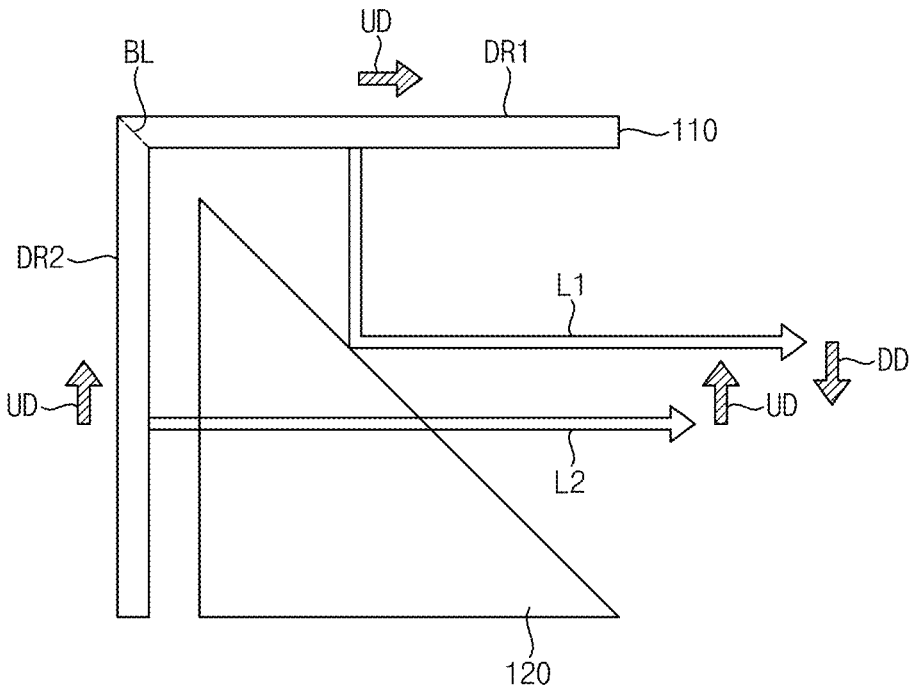
Figure 5A:
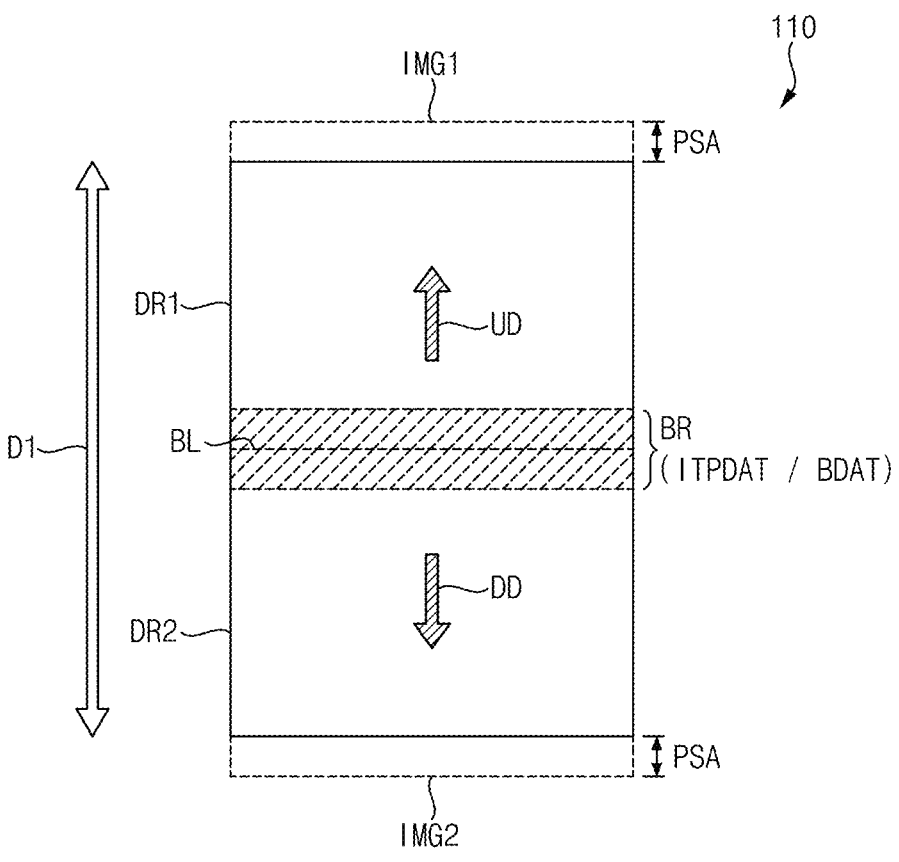
FIG. 5A and FIG. 5B are diagrams for describing an example of a pixel shift operation performed in a display device according to embodiments.
Figure 5B:
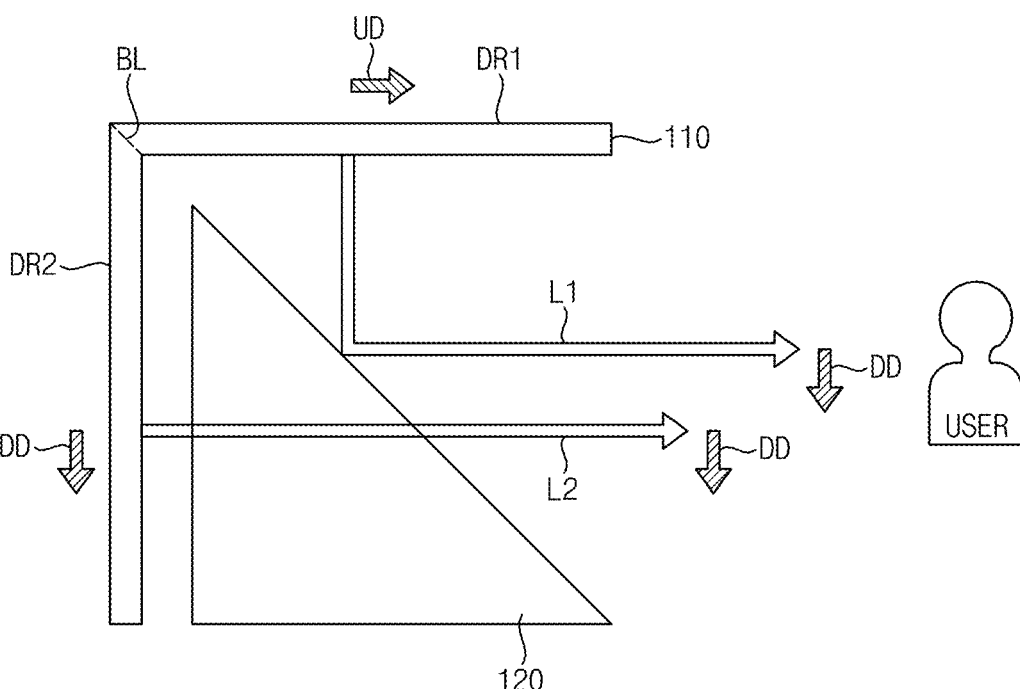
Figure 6A:
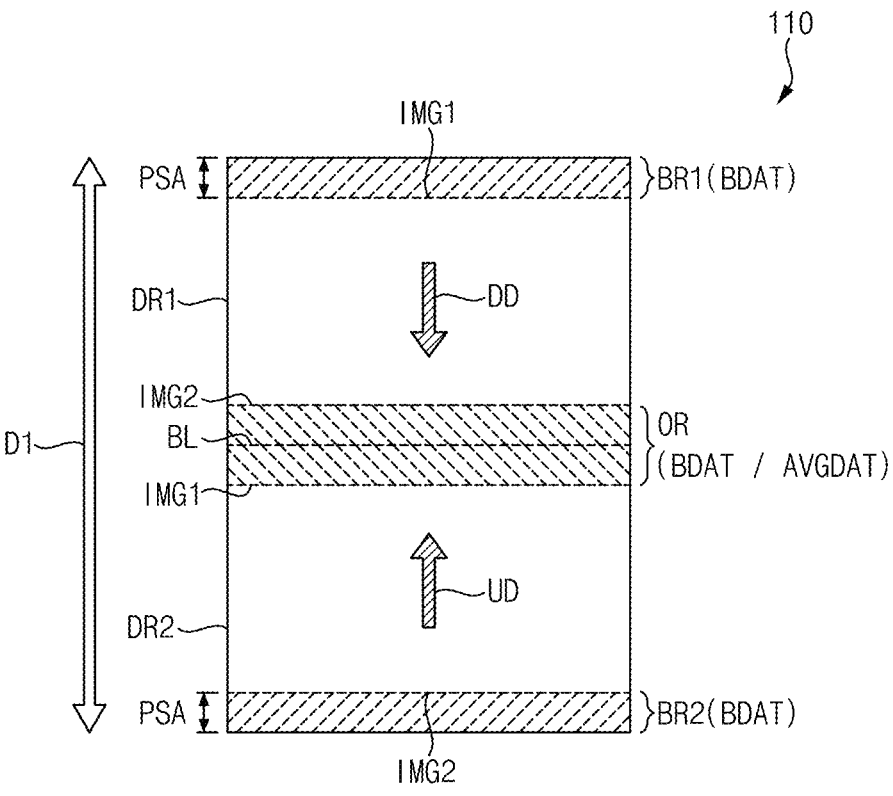
FIG. 6A and FIG. 6B are diagrams for describing another example of a pixel shift operation performed in a display device according to embodiments.
Figure 6B:
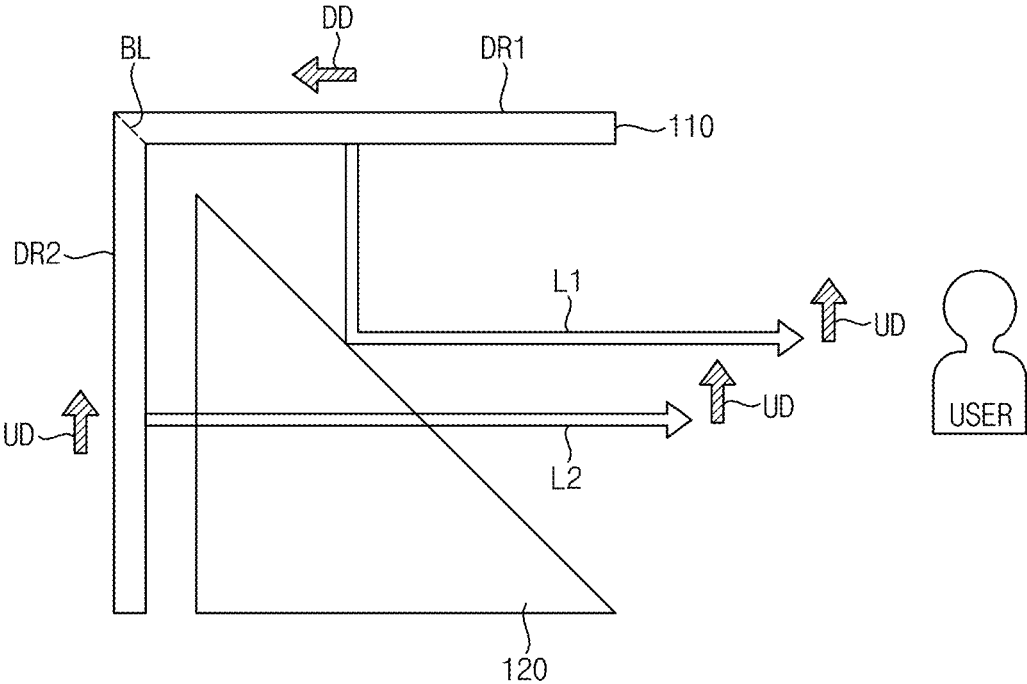
Figure 7:
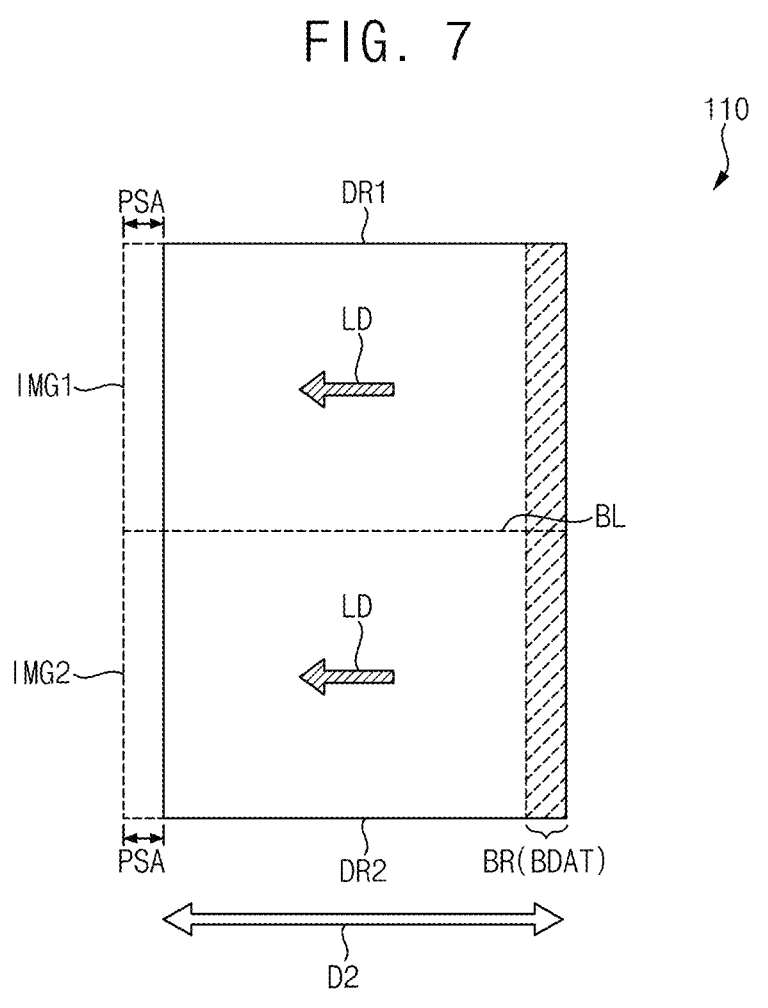
Figure 8:
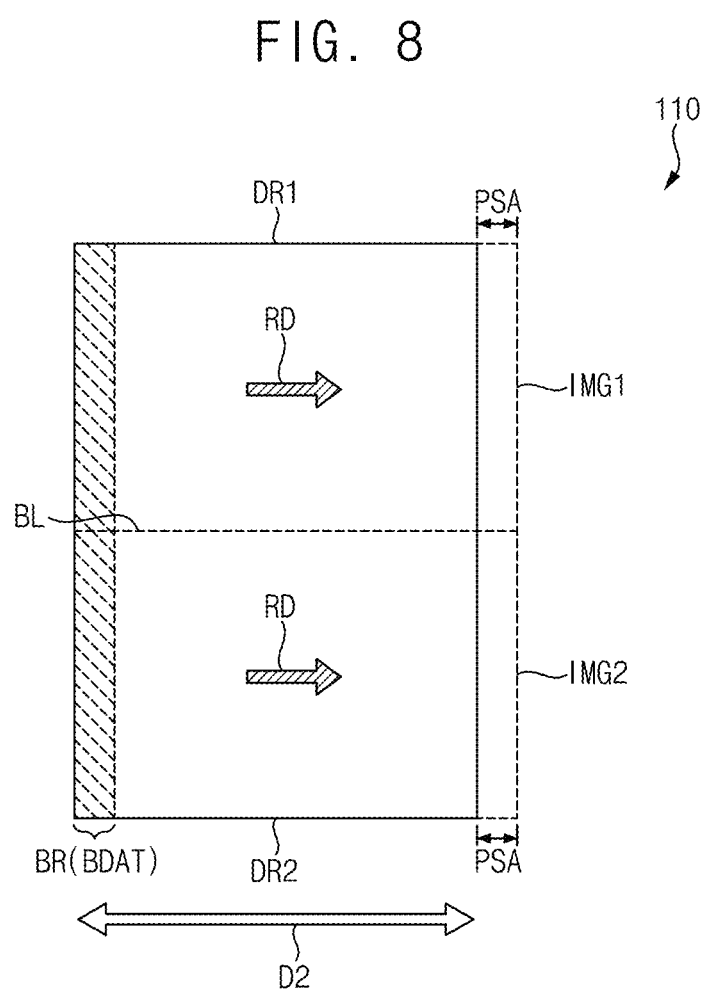
Figure 9:
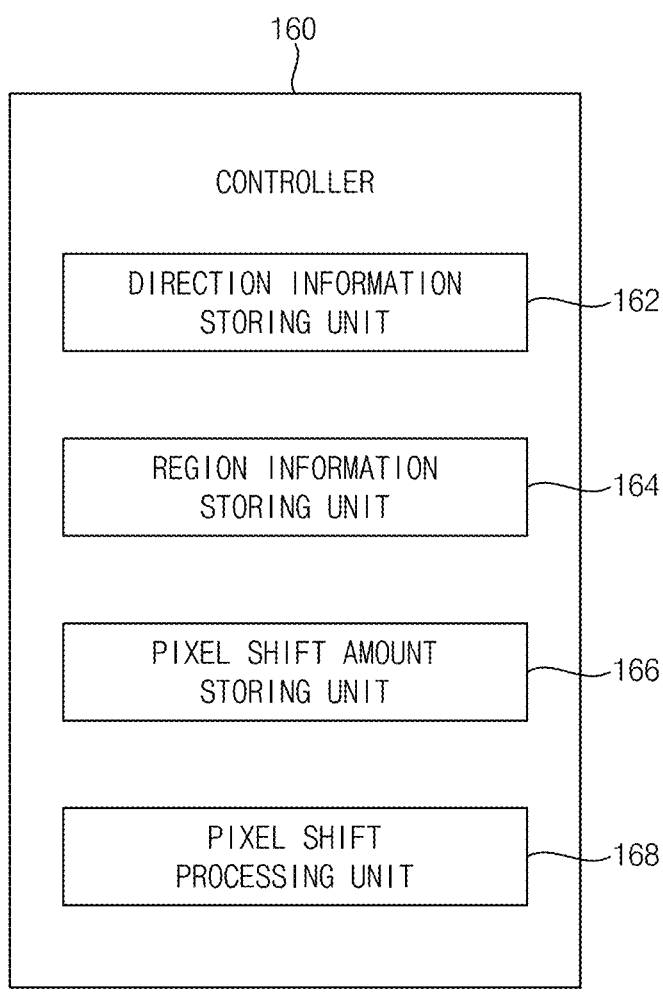
FIG. 9 is a block diagram illustrating a controller included in a display device according to embodiments.

FIG. 1 is a block diagram illustrating a display device according to embodiments, FIG. 2 is a diagram illustrating a display panel and an optical module according to embodiments, FIG. 3A and FIG. 3B are diagrams for describing examples of a pixel shift operation performed in a display device according to embodiments, FIG. 4A and FIG. 4B are diagrams for describing an example of a conventional pixel shift operation, FIG. 5A and FIG. 5B are diagrams for describing an example of a pixel shift operation performed in a display device according to embodiments, FIG. 6A and FIG. 6B are diagrams for describing another example of a pixel shift operation performed in a display device according to embodiments, FIG. 7 is a diagram for describing still another example of a pixel shift operation performed in a display device according to embodiments, FIG. 8 is a diagram for describing still another example of a pixel shift operation performed in a display device according to embodiments, and FIG. 9 is a block diagram illustrating a controller included in a display device according to embodiments.

Referring to FIG. 1, a display device 100 according to embodiments may include a display panel 110 that includes a plurality of pixels, an optical module 120 that reflects or transmits light emitted from the display panel 110, and a panel driver 130 that drives the display panel 110. In some embodiments, the panel driver 130 may include a scan driver 140 that provides scan signals SS to the plurality of pixels, a data driver 150 that provides data signals DS to the plurality of pixels, and a controller 160 that controls the scan driver 140 and the data driver 150. In some embodiments, although it is not illustrated in FIG. 1, the panel driver 130 may further include an emission driver that provides emission signals to the plurality of pixels.

The display panel 110 may include a plurality of data lines, a plurality of scan lines, and the plurality of pixels connected to the plurality of data lines and the plurality of scan lines. Each pixel may include at least one capacitor, at least two transistors and a light emitting element, and the display panel 110 may be a light emitting display panel. In some embodiments, the light emitting element may be an organic light emitting diode ("OLED"), and the display panel 110 may be an OLED display panel. In other embodiments, the light emitting element may be a nano light emitting diode ("NED"), a quantum dot ("QD") light emitting diode, a micro light emitting diode, an inorganic light emitting diode, or any other suitable light emitting element.

The display panel 110 may include a first display region DR1, and a second display region DR2 positioned at a predetermined angle (e.g., about 90 degrees) with respect to the first display region DR1. In some embodiments, the display panel 110 may be a flexible display panel or a bended display panel, and as illustrated in FIG. 2, the display panel 110 may be bent at a boundary line BL between the first display region DR1 and the second display region DR2 in a way such that the first display region DR1 and the second display region DR2 are substantially perpendicular to each other.

The optical module 120 may reflect light emitted from the first display region DR1 of the display panel 110, and may transmit light emitted from the second display region DR2 of the display panel 110. In some embodiments, as illustrated in FIG. 2, the optical module 120 may be a beam splitter that includes an inclined surface 125 having a predetermined angle (e.g., about 45 degrees) with respect to each of the first display region DR1 and the second display region DR2, and that separates light emitted from each of the first and second display regions DR1 and DR2 on the inclined surface 125 into reflected light and transmitted light. In an embodiment, for example, about 50% of light incident on the inclined surface 125 of the beam splitter may be reflected as the reflected light, and about 50% of the light incident on the inclined surface 125 of the beam splitter may be transmitted as the transmitted light, but is not limited thereto.

In an embodiment, for example, as illustrated in FIG. 2, first light L1 emitted from the first display region DR1 may be separated into first reflected light RL1 and first transmitted light TL1 at the inclined surface 125 of the optical module 120, and the first reflected light RL1, which is emitted from the first display region DR1 and reflected from the inclined surface 125, may be provided to a user (or a viewer) USER. Further, second light L2 emitted from the second display region DR2 may be separated into second reflected light RL2 and second transmitted light TL2 at the inclined surface 125 of the optical module 120, and the second transmitted light TL2, which is emitted from the second display region DR2 and transmitted through the inclined surface 125, may be provided to the user USER. As illustrated in FIG. 2, a position of the first light L1 (or the first reflected light RL1) after moving (or traveling) a predetermined distance DIST from the first display region DR1 may be closer to the user USER by a distance difference DIFF than a position of the second light L2 (or the second transmitted light TL2) after moving the same distance DIST from the second display region DR2. In other words, a distance from the user USER to the first display region DR1 may be shorter than a distance from the user USER to the second display region DR2 by the distance difference DIFF. Accordingly, the user USER may perceive different depths for a first image displayed in the first display region DR1 that is relatively close to the user USER and a second image displayed in the second display region DR2 that is relatively far from the user USER, and thus the user USER may recognize the first and second images having different distances or different depths as a three-dimensional ("3D") image.

Referring back to FIG. 1, in an embodiment, the scan driver 140 may generate the scan signals SS based on a scan control signal SCTRL received from the controller 160, and may provide the scan signals SS to the plurality of pixels through the plurality of scan lines. In some embodiments, the scan driver 140 may sequentially provide the scan signals SS to the plurality of pixels on a row-by-row basis along a scan direction SD. Here, the scan direction SD may be a direction in which the scan signals SS are sequentially output, and may be a direction from an uppermost pixel row (or a top pixel row) of the first display region DR1 to a lowermost pixel row (or a bottom pixel row) of the second display region DR2. Further, the scan direction SD may be a direction substantially perpendicular to a longitudinal (or extending) direction of each scan line for transferring the scan signal SS. In some embodiments, the scan control signal SCTRL may include, but is not limited to, a scan start signal and a scan clock signal. Further, in some embodiments, the scan driver 140 may be integrated or formed in the display panel 110. In other embodiments, the scan driver 140 may be implemented with one or more integrated circuits.

The data driver 150 may generate the data signals DS based on output image data ODAT and a data control signal DCTRL received from the controller 160, and may provide the data signals DS to the plurality of pixels through the plurality of data lines. In some embodiments, the data control signal DCTRL may include, but is not limited to, an output data enable signal, a horizontal start signal, and a load signal. In some embodiments, the data driver 150 and the controller 160 may be implemented as a single integrated circuit, and the single integrated circuit may be referred to as a timing controller embedded data driver ("TED") integrated circuit. In other embodiments, the data driver 150 and the controller 160 may be implemented as separate integrated circuits.

The controller 160 (e.g., a timing controller) may receive input image data IDAT and a control signal CTRL from an external host processor (e.g., an application processor ("AP"), a graphics processing unit ("GPU") or a graphics card). In some embodiments, the control signal CTRL may include, but is not limited to, a vertical synchronization signal, a horizontal synchronization signal, an input data enable signal, a master clock signal, etc. The controller 160 may generate the output image data ODAT, the scan control signal SCTRL and the data control signal DCTRL based on the input image data IDAT and the control signal CTRL. The controller 160 may control the scan driver 140 by providing the scan control signal SCTRL to the scan driver 140, and may control the data driver 150 by providing the output image data ODAT and the data control signal DCTRL to the data driver 150.

In the display device 100 according to embodiments, the panel driver 130 may perform a pixel shift operation that periodically shifts an image displayed on the display panel 110 such that an occurrence of an afterimage when displaying a fixed image for a long time may be effectively prevented or substantially delayed. In an embodiment, for example, to shift the image displayed on the display panel 110, the controller 160 of the panel driver 130 may adjust the output image data ODAT provided to the data driver 150. In some embodiments, the pixel shift operation may be performed by a predetermined pixel shift amount (or a pixel shift degree, e.g., a pixel shift distance determined based on a pixel size) every predetermined period of time (e.g., about 10 seconds, about 30 seconds, about 1 minute, etc.) such that movement of the image is not recognized by a user.

In an embodiment, for example, as illustrated in FIG. 3A, a pixel shift operation that shifts an image displayed on the display panel 110 in a right direction (or rightward direction) RD may be performed such that an image displayed on a first pixel PX1 at a first time point is displayed on a second pixel PX2 at a second time point after a predetermined time (e.g., about 10 seconds, about 30 seconds, about 1 minute, etc.) from the first time point. Further, a pixel shift operation that shifts the image displayed on the display panel 110 in a down direction (or a downward direction) DD may be performed such that the image displayed on the second pixel PX2 at the second time point is displayed on a third pixel PX3 at a third time point after the predetermined time from the second time point. Further, a pixel shift operation that shifts the image displayed on the display panel 110 in a left direction (or leftward direction) LD may be performed such that the image displayed on the third pixel PX3 at the third time point is displayed on a fourth pixel PX4 at a fourth time point after the predetermined time after the third time point. Further, a pixel shift operation that shifts the image displayed on the display panel 110 in an up direction (or upward direction) UD may be performed such that the image displayed on the fourth pixel PX4 at the fourth time point is displayed again on the first pixel PX1 at a fifth time point after the predetermined time from the fourth time point. According to embodiments, the image displayed on the display panel 110 may be gradually shifted for the predetermined time, or may be shifted each time a driving time of the display device 100 reaches the predetermined time, but is not limited thereto.

In an embodiment, for example, as illustrated in FIG. 3B, a pixel shift operation that shifts an image displayed on the display panel 110 in an up-right direction URD, a down-right direction DRD, a down-left direction DLD and an up-left direction ULD may be performed such that an image displayed on a first pixel PX1' at a first time point is displayed on a second pixel PX2', a third pixel PX3', a fourth pixel PX4' and the first pixel PX1' at a second time point, a third time point, a fourth time point and a fifth time point, respectively. Although FIGS. 3A and 3B illustrate examples of shift patterns of the pixel shift operation, the pixel shift operation performed in the display device 100 according to embodiments is not limited to the examples of FIGS. 3A and 3B.

A conventional pixel shift operation may be performed in a same direction for the entire display region of the display panel 110. For example, in a case where the panel driver 130 performs the conventional pixel shift operation, as illustrated in FIG. 4A, when the first image displayed in the first display region DR1 is shifted in the up direction UD, the panel driver 130 may shift the second image displayed in the second display region DR2 also in the up direction UD. In this case, as illustrated in FIG. 4B, if the second image or the second light L2 of the second display region DR2 is shifted in the up direction UD, the second image or the second light L2 recognized by the user USER also may be shifted in the up direction UD. However, if the first image or first light L1 of the first display region DR1 is shifted in the up direction UD, the first light L1 reflected from the inclined surface 125 of the optical module 120 may be shifted in the down direction DD, and the first image of the first display region DR1 recognized by the user USER may be shifted in the down direction DD. Thus, when viewed by the user USER, the first image of the first display region DR1 and the second image of the second display region DR2 may be shifted in different directions UD and DD, and the image recognized by the user USER may be distorted.

In the display device 100 according to embodiments, the panel driver 130 may perform a pixel shift operation in a way such that the first and second images respectively displayed in the first and second display regions DR1 and DR2 are shifted in opposite directions along a first direction D1 and are shifted in a same direction along a second direction D2 substantially perpendicular to the first direction D1. Here, the first direction D1 may be a direction substantially perpendicular to the boundary line BL between the first display region DR1 and the second display region DR2, and the second direction D2 may be an extending direction of the boundary line BL between the first display region DR1 and the second display region DR2. Further, the first direction D1 may be referred to as a vertical direction or an up-down direction, and the second direction D2 may be referred to as a horizontal direction or a left-right direction. In some embodiments, the first direction D1 may correspond to the scan direction SD in which the scan signals SS are sequentially output, and the second direction D2 may be the longitudinal direction of each of the scan lines in which the scan signals SS are transferred.

In an embodiment, for example, as illustrated in FIG. 5A, to shift the first and second images IMG1 and IMG2 respectively displayed in the first and second display regions DR1 and DR2 in the opposite directions along the first direction D1, the panel driver 130 may shift the first image IMG1 displayed in the first display region DR1 in the up direction UD by a pixel shift amount PSA, and may shift the second image IMG2 displayed in the second display region DR2 in the down direction DD by the same pixel shift amount PSA. In this case, as illustrated in FIG. 5B, if the second image IMG2 or the second light L2 of the second display region DR2 is shifted in the down direction DD, the second image IMG2 or the second light L2 recognized by the user USER also may be shifted in the down direction DD. Further, if the first image IMG1 or the first light L1 of the first display region DR1 is shifted in the up direction UD, the first light L1 reflected from the inclined surface 125 of the optical module 120 may be shifted in the down direction DD, and the first image IMG1 of the first display region DR1 recognized by the user USER may be shifted in the down direction DD. Thus, when viewed by the user USER, the first image IMG1 of the first display region DR1 and the second image IMG2 of the second display region DR2 may be shifted in the same down direction DD, and the image recognized by the user USER may not be distorted.

In such an embodiment, since the first image IMG1 is shifted in the up direction UD by the pixel shift amount PSA and the second image IMG2 is shifted in the down direction DD by the pixel shift amount PSA as illustrated in FIG. 5A, a blank region BR having a height corresponding to twice the pixel shift amount PSA may be formed between the first image IMG1 and the second image IMG2. In some embodiments, the panel driver 130 may generate interpolated data ITPDAT by interpolating the input image data IDAT representing the first image IMG1 and the input image data IDAT representing the second image IMG2, and may drive the display panel 110 such that the blank region BR displays an image based on the interpolated data ITPDAT. In an embodiment, for example, the panel driver 130 may interpolate the input image data IDAT for a lowermost pixel row (or a bottom pixel row) of the first display region DR1 and the input image data IDAT for an uppermost pixel row (or a top pixel row) of the second display region DR2 to generate the interpolated data ITPDAT, but is not limited thereto. In other embodiments, the panel driver 130 may generate black data BDAT corresponding to a black image, and may drive the display panel 110 such that the blank region BR displays the black image based on the black data BDAT.

In an embodiment, for example, as illustrated in FIG. 6A, to shift the first and second images IMG1 and IMG2 respectively displayed in the first and second display regions DR1 and DR2 in the opposite directions along the first direction D1, the panel driver 130 may shift the first image IMG1 displayed in the first display region DR1 in the down direction DD by a pixel shift amount PSA, and may shift the second image IMG2 displayed in the second display region DR2 in the up direction UD by the same pixel shift amount PSA. In this case, as illustrated in FIG. 6B, if the second image IMG2 or the second light L2 of the second display region DR2 is shifted in the up direction UD, the second image IMG2 or the second light L2 recognized by the user USER also may be shifted in the up direction UD. Further, if the first image IMG1 or the first light L1 of the first display region DR1 is shifted in the down direction DD, the first light L1 reflected from the inclined surface 125 of the optical module 120 may be shifted in the up direction UD, and the first image IMG1 of the first display region DR1 recognized by the user USER may be shifted in the up direction UD. Thus, when viewed by the user USER, the first image IMG1 of the first display region DR1 and the second image IMG2 of the second display region DR2 may be shifted in the same up direction UD, and the image recognized by the user USER may not be distorted.

In this case, since the first image IMG1 is shifted in the down direction DD by the pixel shift amount PSA and the second image IMG2 is shifted in the up direction UD by the pixel shift amount PSA as illustrated in FIG. 6A, an overlap region OR having a height corresponding to twice the pixel shift amount PSA in which the first image IMG1 and the second image IMG2 overlap each other may be formed. In some embodiments, the panel driver 130 may generate the black data BDAT corresponding to the black image, and may drive the display panel 110 such that the overlap region OR displays the black image based on the black data BDAT. In other embodiments, the panel driver 130 may generate average data AVGDAT of the input image data IDAT for the first and second display regions DR1 and DR2 with respect to the overlap region OR, and may drive the display panel 110 such that the overlap region OR displays an image based on the average data AVGDAT. Further, in this case, as illustrated in FIG. 6A, a first blank region BR1 at the top of the first display region DR1 and a second blank region BR2 at the bottom of the second display region DR2 may be formed. The panel driver 130 may generate the black data BDAT corresponding to the black image, and may drive the display panel 110 such that the first blank region BR1 at the top of the first display region DR1 and the second blank region BR2 at the bottom of the second display region DR2 display the black image based on the black data BDAT.

In an embodiment, for example, as illustrated in FIG. 7, to shift the first and second images IMG1 and IMG2 respectively displayed in the first and second display regions DR1 and DR2 in the same direction along the second direction D2, the panel driver 130 may shift the first image IMG1 displayed in the first display region DR1 in the left direction LD by a pixel shift amount PSA, and may shift the second image IMG2 displayed in the second display region DR2 in the left direction LD by the same pixel shift amount PSA. When viewed by the user USER, the first image IMG1 of the first display region DR1 and the second image IMG2 of the second display region DR2 may be shifted in the same left direction LD, and the image recognized by the user USER may not be distorted. In this case, as illustrated in FIG. 7, a right region of the display panel 110 may be a blank region BR, and the panel driver 130 may drive the display panel 110 such that the blank region BR displays the black image based on the black data BDAT.

In an embodiment, for example, as illustrated in FIG. 8, to shift the first and second images IMG1 and IMG2 respectively displayed in the first and second display regions DR1 and DR2 in the same direction along the second direction D2, the panel driver 130 may shift the first image IMG1 displayed in the first display region DR1 in the right direction RD by a pixel shift amount PSA, and may shift the second image IMG2 displayed in the second display region DR2 in the right direction RD by the same pixel shift amount PSA. When viewed by the user USER, the first image IMG1 of the first display region DR1 and the second image IMG2 of the second display region DR2 may be shifted in the same right direction RD, and the image recognized by the user USER may not be distorted. In this case, as illustrated in FIG. 8, a left region of the display panel 110 may be a blank region BR, and the panel driver 130 may drive the display panel 110 such that the blank region BR displays the black image based on the black data BDAT.

To perform these pixel shift operations, in some embodiments, as illustrated in FIG. 9, the controller 160 of the panel driver 130 may include a direction information storing unit 162, a region information storing unit 164, a pixel shift amount storing unit 166 and a pixel shift processing unit 168.

The direction information storing unit 162 may store information about the first direction D1 and the second direction D2. In an embodiment, for example, the information stored in the direction information storing unit 162 may have a first value in a case where the first direction D1 in which the first and second images IMG1 and IMG2 respectively displayed in the first and second display regions DR1 and DR2 are shifted in the opposite directions corresponds to the scan direction SD in which the scan signals SS are sequentially output, and the second direction D2 in which the first and second images IMG1 and IMG2 respectively displayed in the first and second display regions DR1 and DR2 are shifted in the same direction corresponds to the longitudinal direction of each scan line for transferring the scan signal SS. Further, the information stored in the direction information storing unit 162 may have a second value in a case where the first direction D1 corresponds to the longitudinal direction of each scan line and the second direction D2 corresponds to the scan direction SD as described below with reference to FIG. 10.

The region information storing unit 164 may store information about the first display region DR1 and the second display region DR2. In an embodiment, for example, the region information storing unit 164 may store coordinates of pixels located at the top left and the bottom right of the first display region DR1 as the information about the first display region DR1, and may store coordinates of pixels located at the top left and the bottom right of the second display region DR2 as the information about the second display region DR2.

The pixel shift amount storing unit 166 may store information about the pixel shift amount PSA of the pixel shift operation. In an embodiment, for example, the pixel shift amount storing unit 166 may store the number of pixels or the percentage of the overall resolution corresponding to the pixel shift amount PSA. The pixel shift amount PSA may be determined for each model of the display device 100 or each application, and the pixel shift amount storing unit 166 may store information about the determined pixel shift amount PSA.

The pixel shift processing unit 168 may perform the pixel shift operation illustrated in FIGS. 5A through 8. In an embodiment, for example, the pixel shift processing unit 168 may shift the first and second images IMG1 and IMG2 of the first and second display regions DR1 and DR2 in the opposite directions along the first direction D1 and/or in the same direction along the second direction D2 at regular time intervals. Further, the pixel shift processing unit 168 may generate the interpolated data ITPDAT or the black data BDAT with respect to the blank region BR generated by the pixel shift operation, and may generate the black data BDAT or the average data AVGDAT with respect to the overlap region OR generated by the pixel shift operation.

As described above, in the display device 100 according to embodiments, the display panel 110 may be bent in a way such that the first display region DR1 and the second display region DR2 are substantially perpendicular to each other or have a predetermined angle (e.g., about 90 degrees). The optical module 120 may reflect the first light L1 emitted from the first display region DR1, and may transmit the second light L2 emitted from the second display region DR2. Thus, the first and second images IMG1 and IMG2 having different distances or different depths may be provided to the user USER. Accordingly, the display device 100 according to embodiments may display a three-dimensional image.

Further, in the display device 100 according to embodiments, the panel driver 130 may perform the pixel shift operation in a way such that the first and second images IMG1 and IMG2 displayed in the first and second display regions DR1 and DR2 are shifted in the opposite directions along the first direction D1 and are shifted in the same direction along the second direction D2. Accordingly, in the display device 100 that displays the three-dimensional image according to embodiments, the pixel shift operation may be accurately performed without image distortion.

Figure 10:
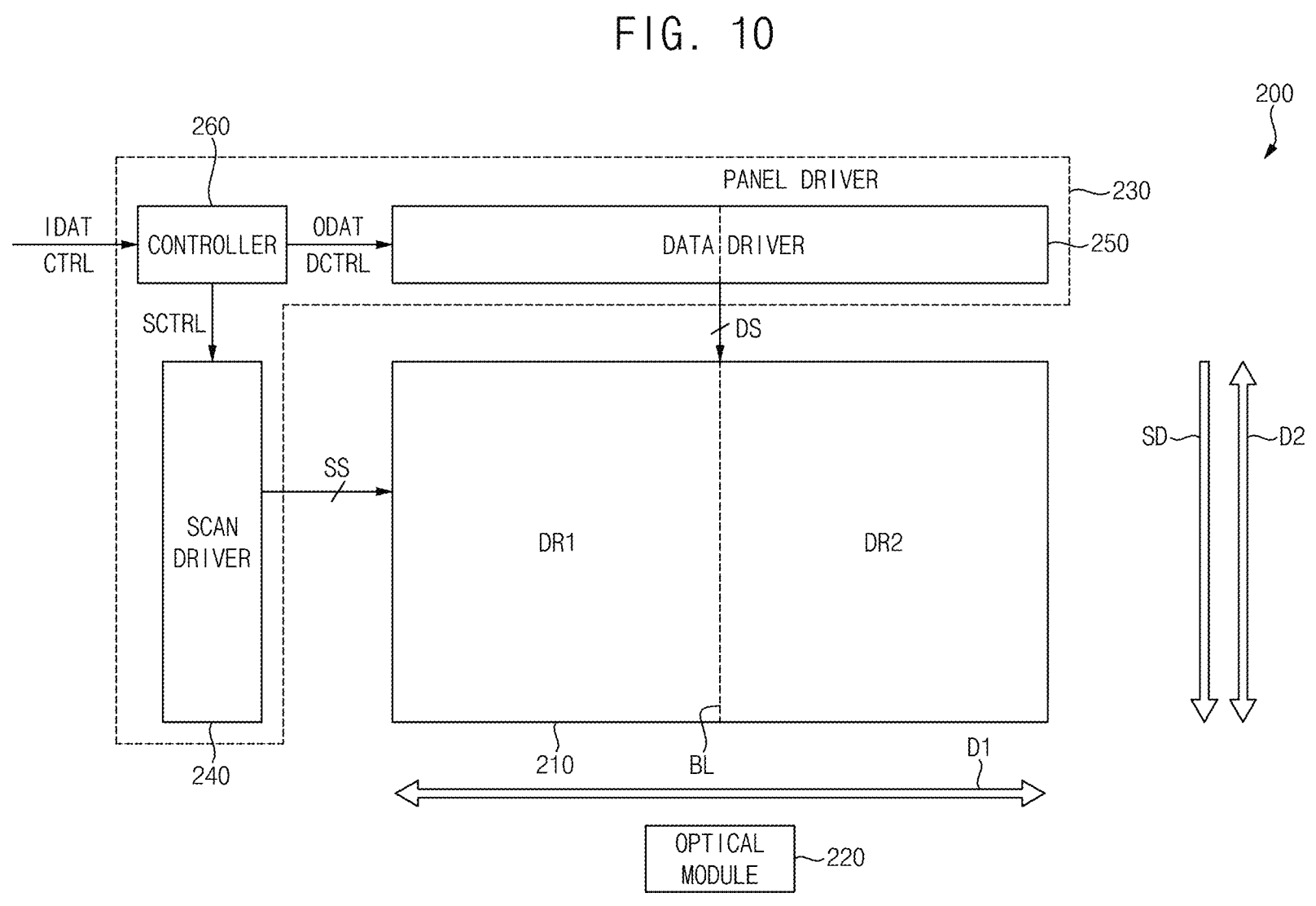

FIG. 10 is a block diagram illustrating a display device according to embodiments.

Referring to FIG. 10, a display device 200 according to embodiments may include a display panel 210, an optical module 220 and a panel driver 230. In some embodiments, the panel driver 230 may include a scan driver 240, a data driver 250 and a controller 260. The display device 200 of FIG. 10 may have substantially the same configuration and substantially the same operation as a display device 100 of FIG. 1, except that the display panel 210 may be bent in a way such that a first display region DR1 and a second display region DR2 have a boundary line BL extending in a scan direction SD therebetween. In an embodiment of the display device 200 of FIG. 10, the boundary line BL between the first display region DR1 and the second display region DR2 may extend in the scan direction SD or a vertical direction, and may be substantially perpendicular to each scan line for transferring a scan signal SS or a horizontal direction.

In an embodiment of the display device 200 of FIG. 10, to perform a pixel shift operation, the panel driver 230 may shift first and second images respectively displayed in the first and second display regions DR1 and DR2 in opposite directions along a first direction D1 corresponding to a longitudinal direction of each scan line, and may shift the first and second images respectively displayed in the first and second display regions DR1 and DR2 in the same direction along a second direction D2 corresponding to the scan direction SD. That is, the first direction D1 in which the first and second images are shifted in the opposite directions may be the longitudinal direction of each scan line, and the second direction D2 in which the first and second images are shifted in the same direction may be the scan direction SD. In an embodiment, for example, when the panel driver 230 shifts the first image of the first display region DR1 in an up direction, the panel driver 230 may shift the second image of the second display region DR2 in the up direction. Further, when the panel driver 230 shifts the first image of the first display region DR1 in a down direction, the panel driver 230 may shift the second image of the second display region DR2 in the down direction. Further, when the panel driver 230 shifts the first image of the first display region DR1 in a left direction, the panel driver 230 may shift the second image of the second display region DR2 in a right direction. Further, when the panel driver 230 shifts the first image of the first display region DR1 in the right direction, the panel driver 230 may shift the second image of the second display region DR2 in the left direction.

Figure 11:
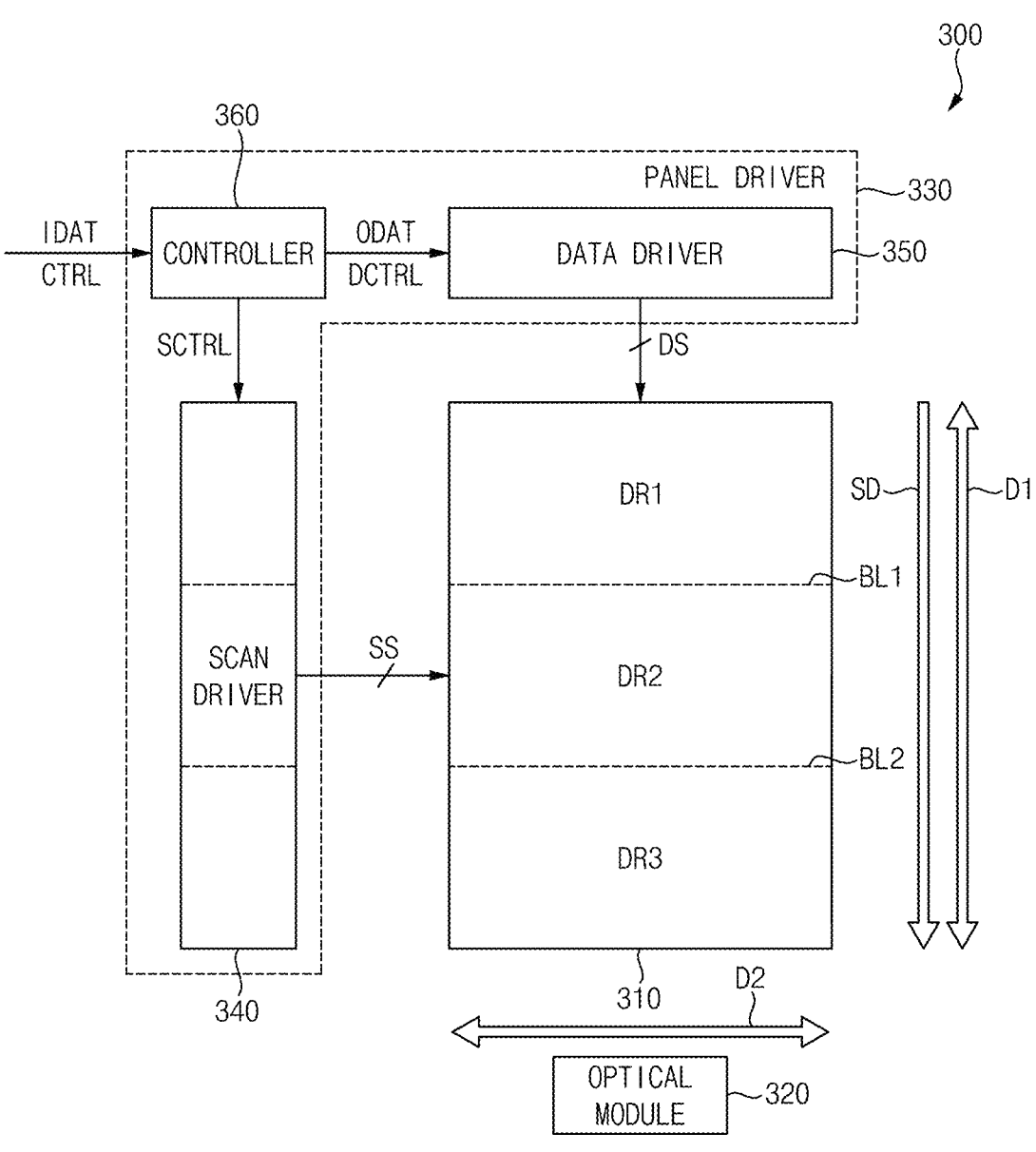
FIG. 11 is a block diagram illustrating a display device according to embodiments.
Figure 12:
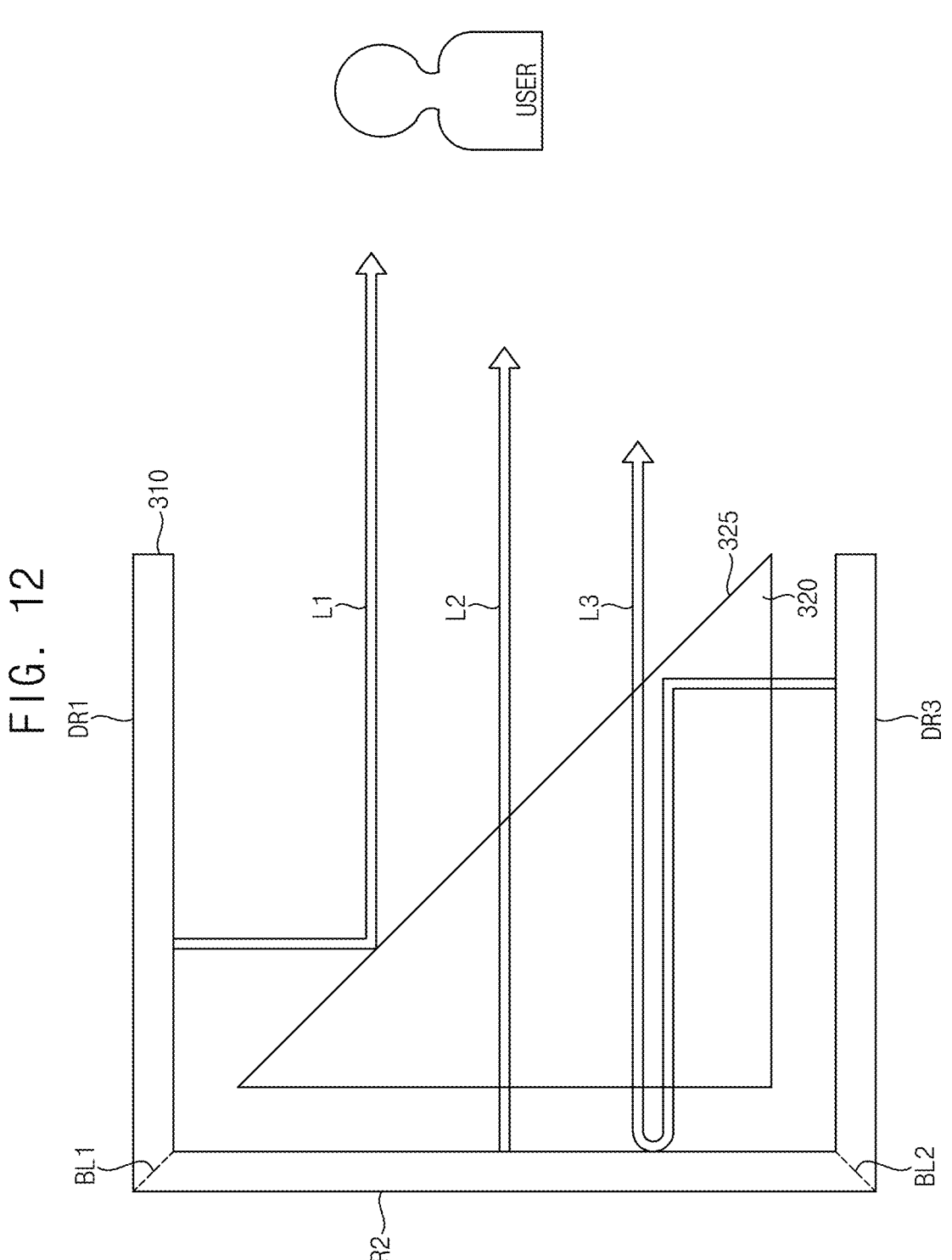
FIG. 12 is a diagram illustrating a display panel and an optical module according to embodiments.
Figure 13A:
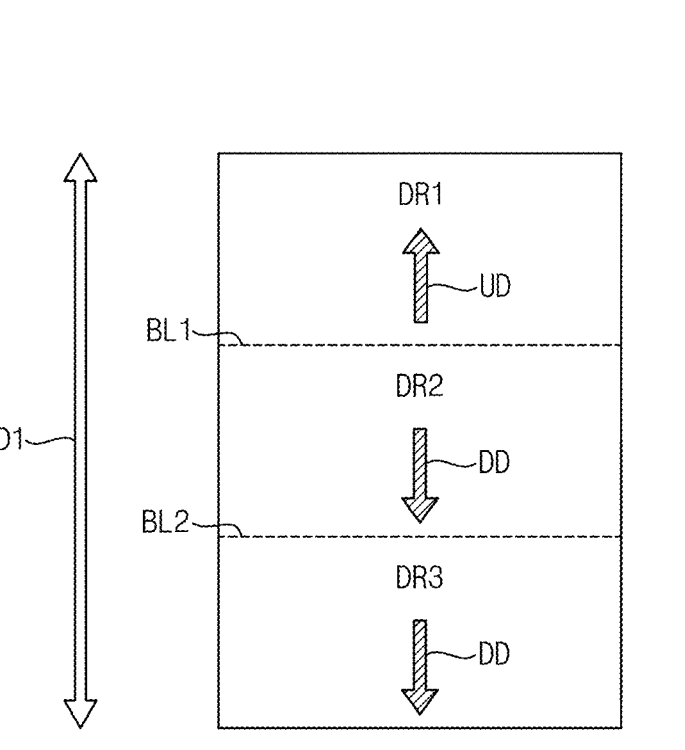
FIG. 13A and FIG. 13B are diagrams for describing an example of a pixel shift operation performed in a display device according to embodiments.
Figure 13B:
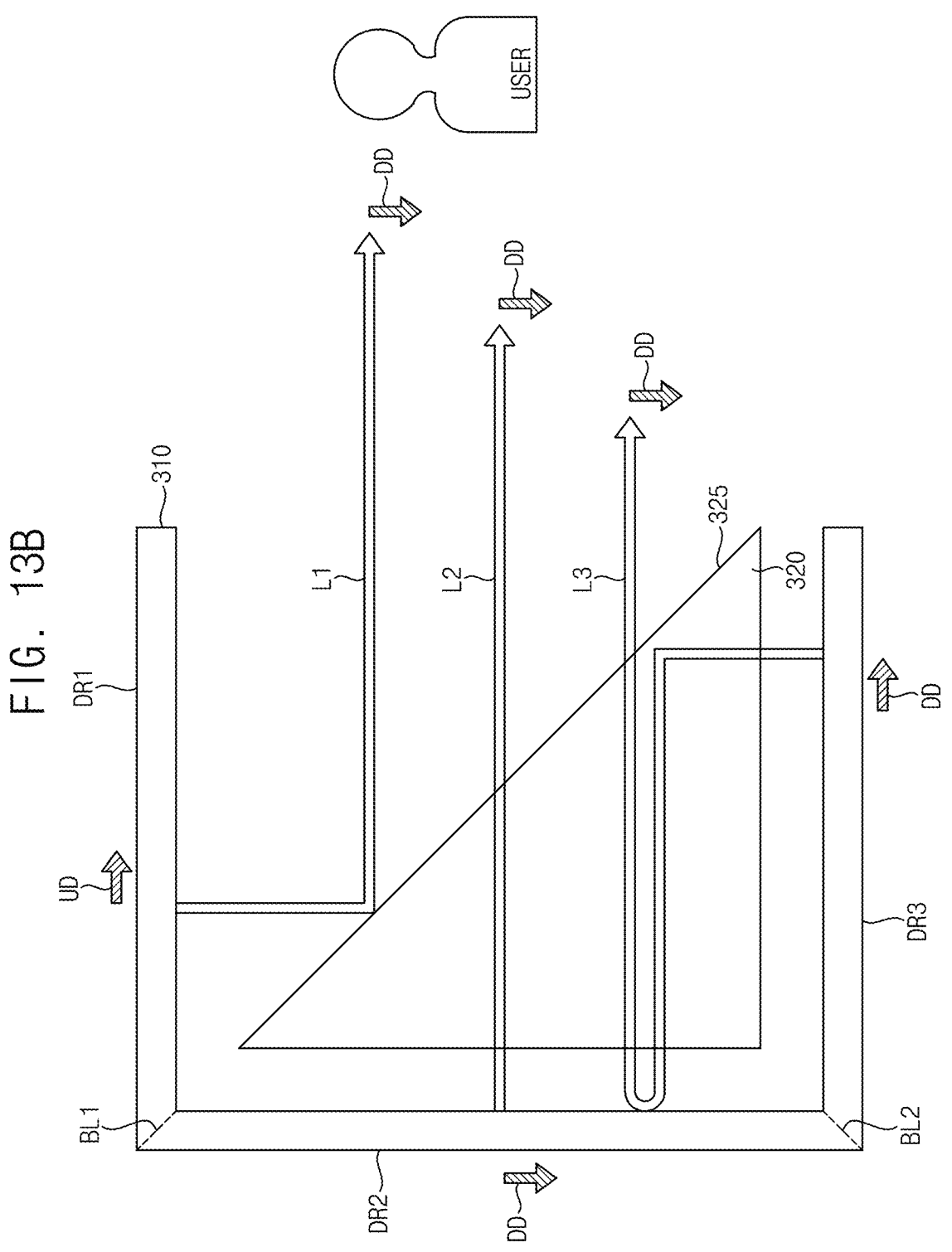
Figure 14A:
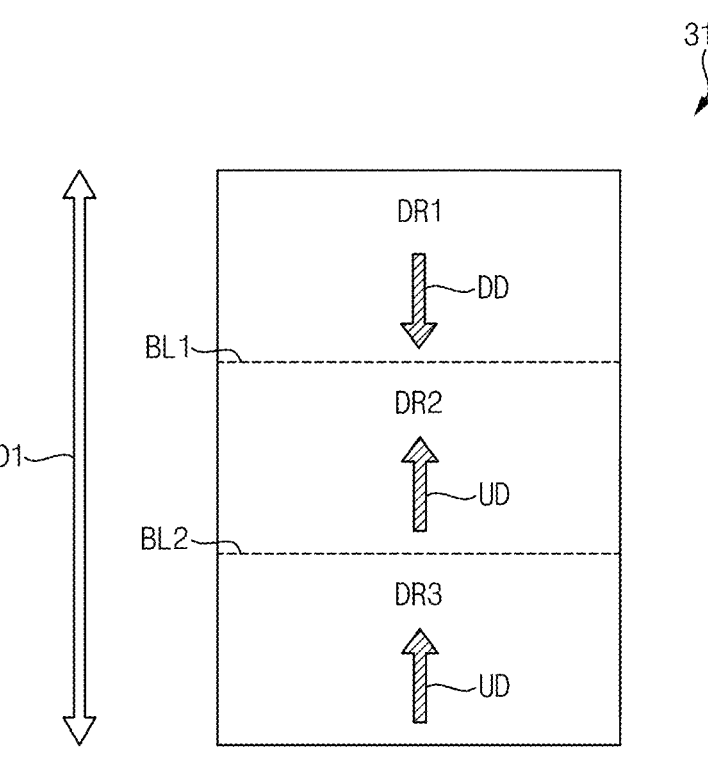
FIG. 14A and FIG. 14B are diagrams for describing another example of a pixel shift operation performed in a display device according to embodiments.
Figure 14B:
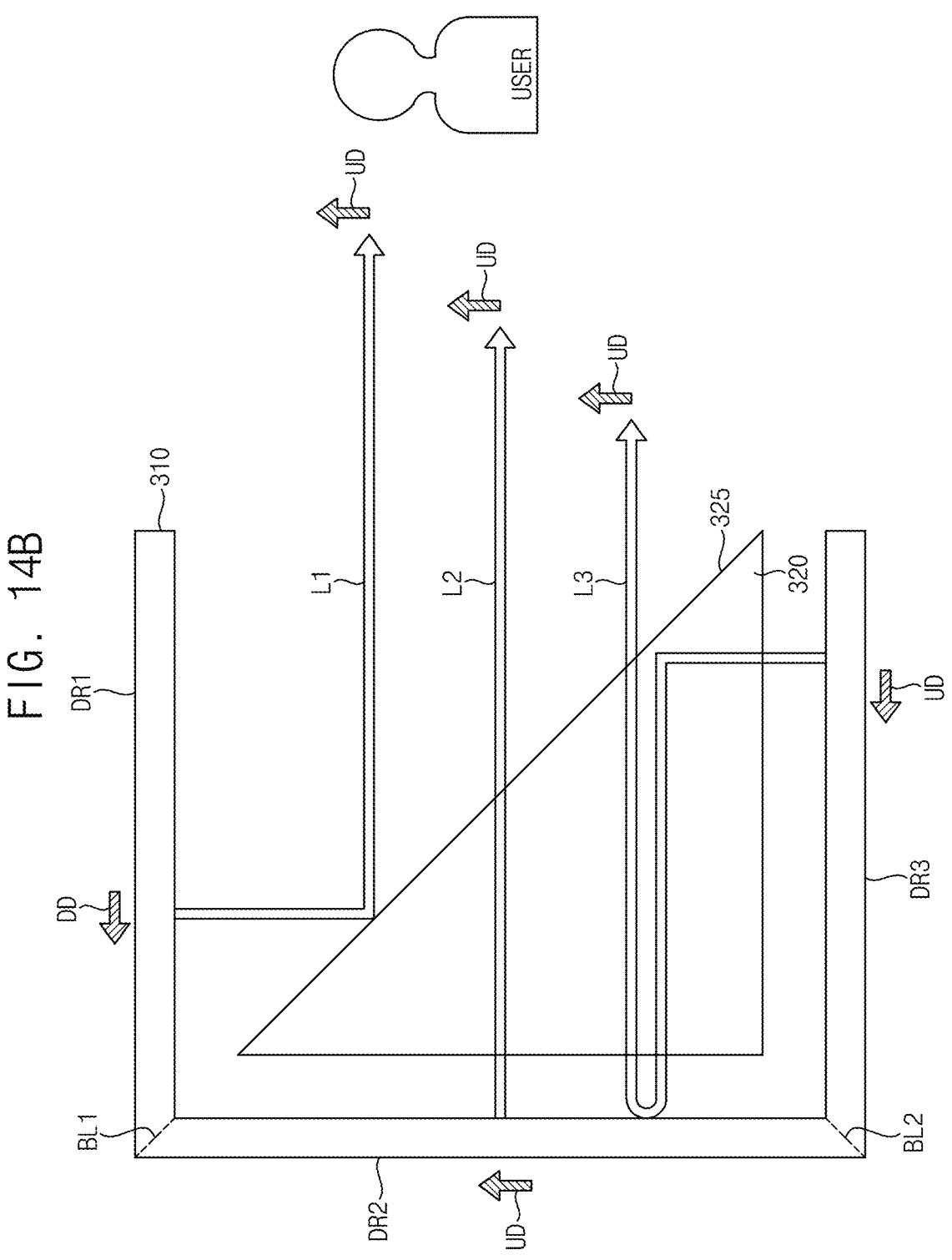
Figure 15:
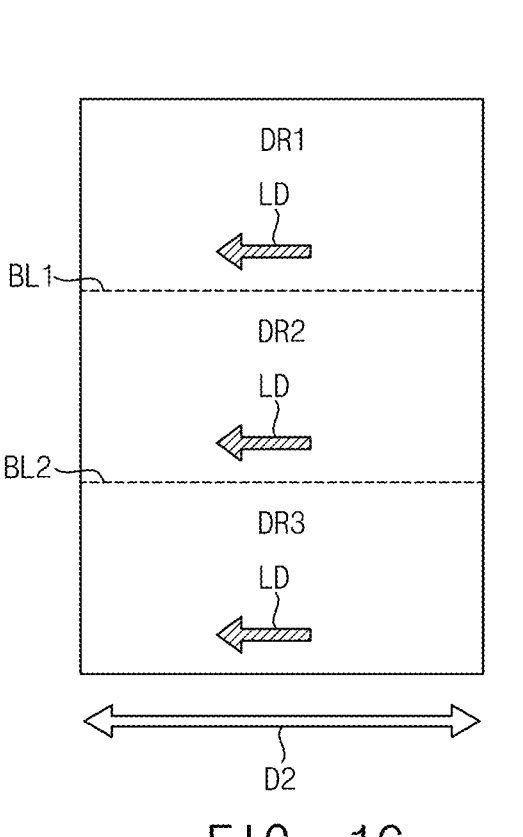
FIG. 15 is a diagram for describing still another example of a pixel shift operation performed in a display device according to embodiments.
Figure 16:
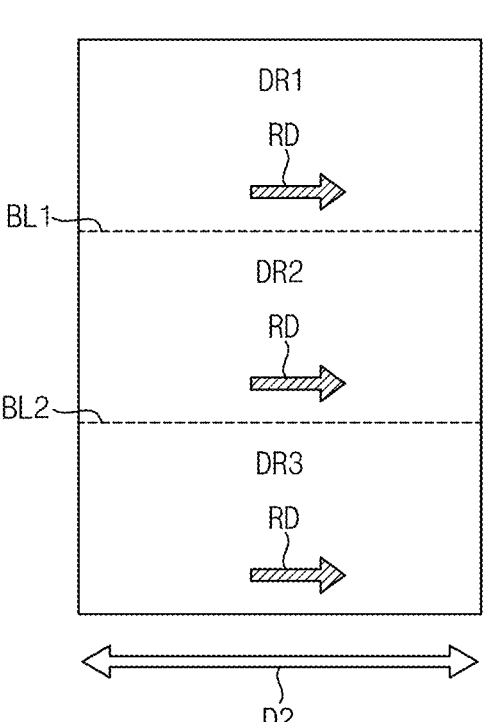
FIG. 16 is a diagram for describing still another example of a pixel shift operation performed in a display device according to embodiments.

FIG. 11 is a block diagram illustrating a display device according to embodiments, FIG. 12 is a diagram illustrating a display panel and an optical module according to embodiments, FIG. 13A and FIG. 13B are diagrams for describing an example of a pixel shift operation performed in a display device according to embodiments, FIG. 14A and FIG. 14B are diagrams for describing another example of a pixel shift operation performed in a display device according to embodiments, FIG. 15 is a diagram for describing still another example of a pixel shift operation performed in a display device according to embodiments, and FIG. 16 is a diagram for describing still another example of a pixel shift operation performed in a display device according to embodiments.

Referring to FIG. 11, a display device 300 according to embodiments may include a display panel 310, an optical module 320 and a panel driver 330. The display panel 310 may include a first display region DR1, a second display region DR2 and a third display region DR3. In some embodiments, the panel driver 330 may include a scan driver 340, a data driver 350 and a controller 360. The display device 300 of FIG. 11 may have substantially the same configuration and substantially the same operation as a display device 100 of FIG. 1, except that the display panel 310 may further include the third display region DR3 that faces the first display region DR1 and is substantially perpendicular to the second display region DR2.

In an embodiment, as illustrated in FIG. 12, the display panel 310 may be bent at a first boundary line BL1 between the first display region DR1 and the second display region DR2, and may be further bent at a second boundary line BL2 between the second display region DR2 and the third display region DR3. Thus, the display panel 310 may be bent in a way such that the first display region DR1 and the third display region DR3 face each other, and such that the second display region DR2 is substantially perpendicular to each of the first display region DR1 and the third display region DR3. First light L1 emitted from the first display region DR1 may be reflected from an inclined surface 325 of the optical module 320 (e.g., a beam splitter), and may be provided to a user USER. Second light L2 emitted from the second display region DR2 may be transmitted through the inclined surface 325 of the optical module 320, and may be provided to the user USER. Further, third light L3 emitted from the third display region DR3 may be reflected from the inclined surface 325 of the optical module 320, may move toward the second display region DR2, may be reflected again from the second display region DR2, and then may be provided to the user USER by being transmitted through the inclined surface 325 of the optical module 320. Distances of the first, second and third lights L1, L2 and L3 from the first, second and third display regions DR1, DR2 and DR3 to the user USER may be different from one another, and the user USER may recognize the first, second and third images displayed in the first, second and third display regions DR1, DR2 and DR3 as a three-dimensional image based on the distance difference.

In the display device 300 according to embodiments, to perform a pixel shift operation, the panel driver 330 may shift the first, second and third images displayed in the first, second and third display regions DR1, DR2 and DR3 along a first direction D1 such that the first and second images are shifted in opposite directions along the first direction D1, such that the first and third images are shifted in opposite directions along the first direction D1, and such that the second and third images are shifted in a same direction along the first direction D1. Further, to perform the pixel shift operation, the panel driver 330 may shift the first, second and third images displayed in the first, second and third display regions DR1, DR2 and DR3 in the same direction along the second direction D2.

In an embodiment, for example, as illustrated in FIG. 13A, the panel driver 330 may shift the first image displayed in the first display region DR1 in an up direction UD, may shift the second image displayed in the second display region DR2 in a down direction DD, and may shift the third image displayed in the third display region DR3 in the down direction DD. In this case, as illustrated in FIG. 13B, when viewed by the user USER, the first, second and third lights L1, L2 and L3 or the first, second and third images of the first, second and third display regions DR1, DR2 and DR3 may be shifted in the same down direction DD, and an image recognized by the user USER may not be distorted.

In an embodiment, for example, as illustrated in FIG. 14A, the panel driver 330 may shift the first image displayed in the first display region DR1 in the down direction DD, may shift the second image displayed in the second display region DR2 in the up direction UD, and may shift the third image displayed in the third display region DR3 in the up direction UD. In this case, as illustrated in FIG. 14b, when viewed by the user USER, the first, second and third lights L1, L2 and L3 or the first, second and third images of the first, second and third display regions DR1, DR2 and DR3 may be shifted in the same up direction UD, and an image recognized by the user USER may not be distorted.

In an embodiment, for example, as illustrated in FIG. 15, the panel driver 330 may shift the first image displayed in the first display region DR1 in a left direction LD, may shift the second image displayed in the second display region DR2 in the left direction LD, and may shift the third image displayed in the third display region DR3 in the left direction LD. In this case, when viewed by the user USER, the first, second and third images of the first, second and third display regions DR1, DR2 and DR3 may be shifted in the same left direction LD, and an image recognized by the user USER may not be distorted.

In an embodiment, for example, as illustrated in FIG. 16, the panel driver 330 may shift the first image displayed in the first display region DR1 in a right direction RD, may shift the second image displayed in the second display region DR2 in the right direction RD, and may shift the third image displayed in the third display region DR3 in the right direction RD. In this case, when viewed by the user USER, the first, second and third images of the first, second and third display regions DR1, DR2 and DR3 may be shifted in the same right direction RD, and an image recognized by the user USER may not be distorted.

As described above, the display device 300 according to embodiments may display a three-dimensional image by providing the first, second and third images having different distances or different depths to the user USER. Further, the display device 300 according to embodiments may perform the pixel shift operation without image distortion.

Figure 17:
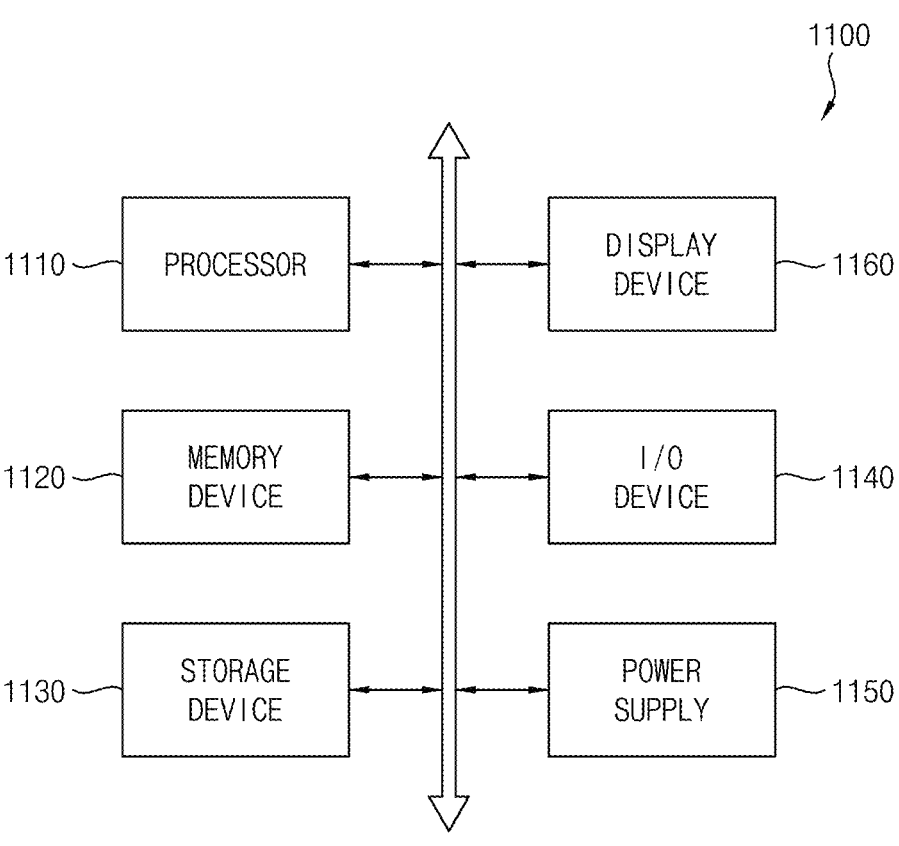
FIG. 17 is a block diagram illustrating an electronic device including a display device according to embodiments.

FIG. 17 is a block diagram illustrating an electronic device including a display device according to embodiments.

Referring to FIG. 17, an embodiment of an electronic device 1100 may include a processor 1110, a memory device 1120, a storage device 1130, an input/output (I/O) device 1140, a power supply 1150 and a display device 1160. The electronic device 1100 may further include a plurality of ports for communicating with a video card, a sound card, a memory card, a universal serial bus ("USB") device, other electric devices, etc.

The processor 1110 may perform various computing functions or tasks. The processor 1110 may be an application processor ("AP"), a micro-processor, a central processing unit ("CPU"), etc. The processor 1110 may be coupled to other components via an address bus, a control bus, a data bus, etc. Further, in some embodiments, the processor 1110 may be further coupled to an extended bus such as a peripheral component interconnection ("PCI") bus.

The memory device 1120 may store data for operations of the electronic device 1100. For example, the memory device 1120 may include at least one non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, etc., and/or at least one volatile memory device such as a dynamic random access memory ("DRAM") device, a static random access memory ("SRAM") device, a mobile dynamic random access memory ("mobile DRAM") device, etc.

The storage device 1130 may be a solid state drive ("SSD") device, a hard disk drive ("HDD") device, a compact disc-read only memory ("CD-ROM") device, etc. The I/O device 1140 may be an input device such as a keyboard, a keypad, a mouse, a touch screen, etc., and an output device such as a printer, a speaker, etc. The power supply 1150 may supply power for operations of the electronic device 1100. The display device 1160 may be coupled to other components through the buses or other communication links.

In such an embodiment, the display device 1160 may correspond to an embodiment of the display device described above. That is, in the display device 1160, as described above, a display panel may be bent in a way such that a first display region and a second display region have a predetermined angle therebetween. An optical module may reflect light emitted from the first display region, and may transmit light emitted from the second display region. Accordingly, the display device according to embodiments may display a three-dimensional image. Further, in the display device 1160, a panel driver may perform a pixel shift operation in way such that first and second images respectively displayed in the first and second display regions are shifted in opposite directions along a first direction and are shifted in the same direction along a second direction perpendicular to the first direction. Accordingly, in the display device 1160 that displays the three-dimensional image, the pixel shift operation may be accurately performed without image distortion.

Embodiments of the invention may be applied to any electronic device 1100 including the display device 1160, for example, a mobile phone, a smart phone, a virtual reality ("VR") device, a television ("TV") (e.g., a digital TV, a three-dimensional ("3D") TV, etc.), a wearable electronic device, a personal computer ("PC") (e.g. a laptop computer, a tablet computer, etc.), a home appliance, a personal digital assistant ("PDA"), a portable multimedia player ("PMP"), a digital camera, a music player, a portable game console, a navigation device, etc.

Figure 18:
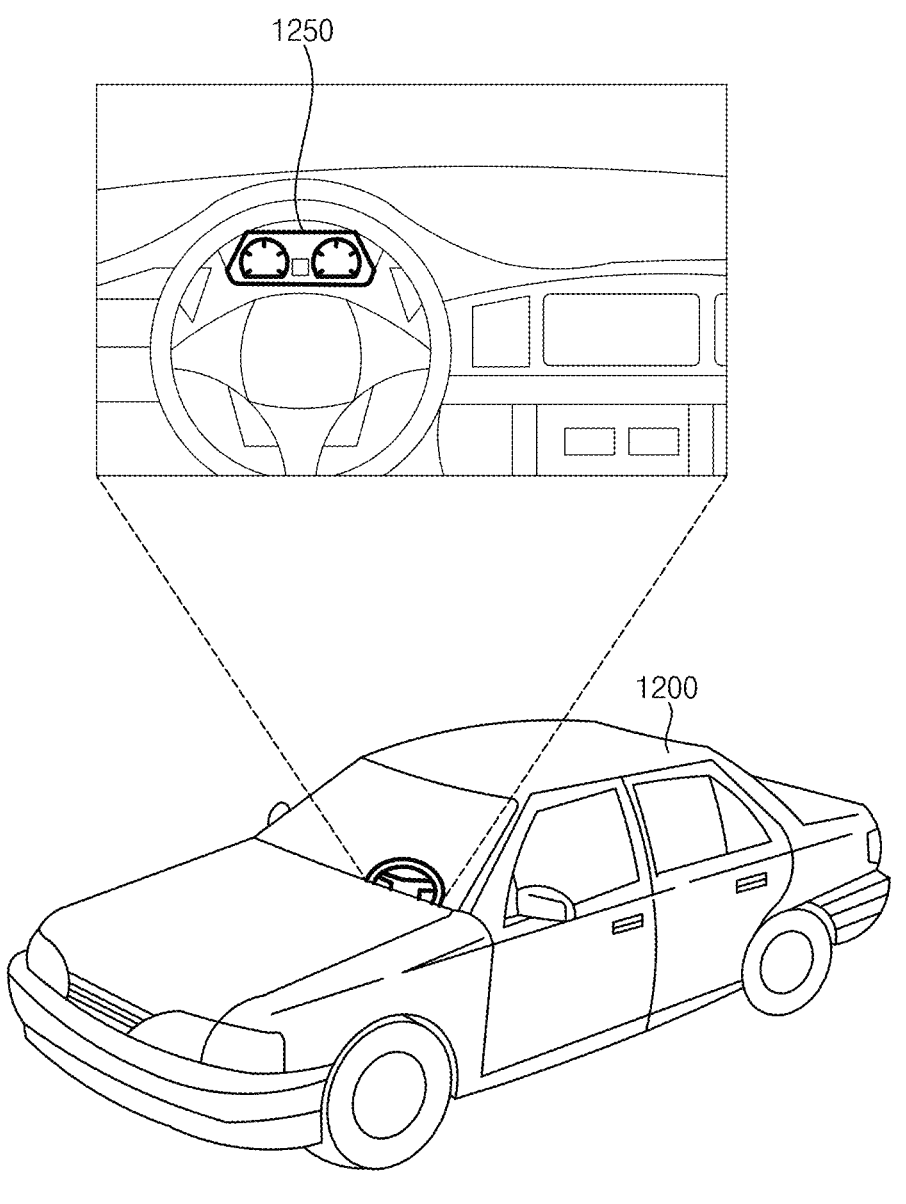
FIG. 18 is a diagram illustrating an example of a display device mounted on a vehicle according to embodiments.

FIG. 18 is a diagram illustrating an example of a display device mounted on a vehicle according to embodiments.

Referring to FIG. 18, a display device 1250 according to embodiments may be mounted on a vehicle 1200. In an embodiment of the vehicle 1200, for example, the display device 1250 may be positioned opposite to face a seat of a driver seat of the vehicle 1200, and may display a three-dimensional image representing a speed or revolutions per minute of the vehicle 1200. In such an embodiment, the display device 1250 may be referred to as a three-dimensional instrument panel or a three-dimensional cluster.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:
a display panel including a first display region, and a second display region positioned at a predetermined angle with respect to the first display region;
an optical module comprising a beam splitter, the optical module being configured to reflect light emitted from the first display region, and transmit light emitted from the second display region; and
a panel driver which drives the display panel,
wherein, to prevent image distortion for a user viewing the display panel, the panel driver performs a pixel shift operation in a way such that first and second images respectively displayed in the first and second display regions are shifted in opposite directions along a first direction, and are shifted in a same direction along a second direction substantially perpendicular to the first direction,
wherein the display panel further includes a third display region facing the first display region, and positioned substantially perpendicular to the second display region, and
wherein light emitted from the third display region is reflected from an inclined surface of the optical module, moves toward the second display region, is reflected again from the second display region, and is provided to the user by being transmitted through the inclined surface of the optical module.

2. The display device of claim 1,
wherein the display panel is bent in a way such that the first display region and the second display region are substantially perpendicular to each other,
wherein the beam splitter includes an inclined surface, and wherein the beam splitter divides light emitted from each of the first and second display regions and incident on the inclined surface into reflected light and transmitted light.

3. The display device of claim 2, wherein the reflected light of the first display region, which is emitted from the first display region and is reflected from the inclined surface of the beam splitter, is provided to the user, and wherein the transmitted light of the second display region, which is emitted from the second display region and transmits through the inclined surface of the beam splitter, is provided to the user.

4. The display device of claim 1, wherein the first direction is a direction substantially perpendicular to a boundary line between the first display region and the second display region, and wherein the second direction is an extending direction of the boundary line between the first display region and the second display region.

5. The display device of claim 1, wherein the first direction is a scan direction in which scan signals are sequentially output, and wherein the second direction is an extending direction of each of scan lines through which the scan signals are transferred.

6. The display device of claim 1, wherein the panel driver shifts the first image displayed in the first display region in an up direction by a pixel shift amount, and shifts the second image displayed in the second display region in a down direction by the pixel shift amount.

7. The display device of claim 6, wherein the panel driver generates interpolated data by interpolating image data for a lowermost pixel row in the first display region and image data for an uppermost pixel row in the second display region, and wherein the display panel displays an image based on the interpolated data in a blank region between the first image and the second image when the first image and the second image are shifted.

8. The display device of claim 6, wherein the display panel displays a black image in a blank region between the first image and the second image when the first image and the second image are shifted.

9. The display device of claim 1, wherein the panel driver shifts the first image displayed in the first display region in a left direction by a pixel shift amount, and shifts the second image displayed in the second display region in the left direction by the pixel shift amount.

10. The display device of claim 1, wherein the panel driver is configured to store information about the first direction and the second direction, store information about the first display region and the second display region, store information about a pixel shift amount of the pixel shift operation, perform the pixel shift operation, and generate image data for a blank region or an overlap region generated by the pixel shift operation.

11. The display device of claim 1, wherein the panel driver shifts a third image displayed in the third display region such that the first and third images are shifted in opposite directions along the first direction, the second and third images are shifted in a same direction along the first direction, and the first, second and third images are shifted in a same direction along the second direction.

12. A display device comprising:
a display panel including a first display region and a second display region, wherein the display panel is bent in a way such that the first display region and the second display region are substantially perpendicular to each other;

an optical module including an inclined surface, wherein the optical module reflects light emitted from the first display region on the inclined surface, and transmits light emitted from the second display region on the inclined surface; and a panel driver which drives the display panel, wherein the panel driver performs a pixel shift operation, wherein, to prevent image distortion for a user viewing the display panel, when a first image displayed in the first display region is shifted in an up direction, the panel driver shifts a second image displayed in the second display region in a down direction, wherein, when the first image is shifted in the down direction, the panel driver shifts the second image in the up direction, wherein, when the first image is shifted in a left direction, the panel driver shifts the second image in the left direction, and wherein, when the first image is shifted in a right direction, the panel driver shifts the second image in the right direction, wherein the display panel further includes a third display region facing the first display region, and positioned substantially perpendicular to the second display region, and wherein light emitted from the third display region is reflected from the inclined surface of the optical module, moves toward the second display region, is reflected again from the second display region, and is provided to the user by being transmitted through the inclined surface of the optical module.

13. A display device comprising:
a display panel including a first display region, a second display region and a third display region, wherein the display panel is bent in a way such that the first display region and the third display region face each other and the second display region is substantially perpendicular to each of the first display region and the third display region;

an optical module including an inclined surface, where the optical module divides light emitted from each of the first, second and third display regions and incident on the inclined surface into reflected light and transmitted light; and a panel driver which drives the display panel, wherein the panel driver performs a pixel shift operation, wherein, when a first image displayed in the first display region is shifted in an up direction, the panel driver shifts a second image displayed in the second display region in a down direction, and shifts a third image displayed in the third display region in the down direction, wherein, when the first image is shifted in the down direction, the panel driver shifts the second image in the up direction, and shifts the third image in the up direction, wherein, when the first image is shifted in a left direction, the panel driver shifts the second image in the left direction, and shifts the third image in the left direction, and wherein, when the first image is shifted in a right direction, the panel driver shifts the second image in the right direction, and shifts the third image in the right direction.

14. An electronic device comprising:
a processor configured to provide input image data;
a display panel including a first display region, and a second display region positioned at a predetermined angle with respect to the first display region;

an optical module comprising a beam splitter, the optical module being configured to reflect light emitted from the first display region, and transmit light emitted from the second display region; and a panel driver which receives the input image data from the processor, and drives the display panel based on the input image data, wherein, to prevent image distortion for a user viewing the display panel, the panel driver performs a pixel shift operation in a way such that first and second images respectively displayed in the first and second display regions are shifted in opposite directions along a first direction, and are shifted in a same direction along a second direction substantially perpendicular to the first direction, wherein the display panel further includes a third display region facing the first display region, and positioned substantially perpendicular to the second display region, and wherein light emitted from the third display region is reflected from an inclined surface of the optical module, moves toward the second display region, is reflected again from the second display region, and is provided to the user by being transmitted through the inclined surface of the optical module.

15. The electronic device of claim 14, wherein the display panel is bent in a way such that the first display region and the second display region are substantially perpendicular to each other, wherein the beam splitter includes an inclined surface, and wherein the beam splitter divides light emitted from each of the first and second display regions and incident on the inclined surface into reflected light and transmitted light.

16. The electronic device of claim 15, wherein the reflected light of the first display region, which is emitted from the first display region and is reflected from the inclined surface of the beam splitter, is provided to the user, and wherein the transmitted light of the second display region, which is emitted from the second display region and transmits through the inclined surface of the beam splitter, is provided to the user.

17. The electronic device of claim 14, wherein the first direction is a direction substantially perpendicular to a boundary line between the first display region and the second display region, and wherein the second direction is an extending direction of the boundary line between the first display region and the second display region.

18. The electronic device of claim 14, wherein the first direction is a scan direction in which scan signals are sequentially output, and wherein the second direction is an extending direction of each of scan lines through which the scan signals are transferred.

19. The electronic device of claim 14, wherein the panel driver shifts the first image displayed in the first display region in an up direction by a pixel shift amount, and shifts the second image displayed in the second display region in a down direction by the pixel shift amount.

* * * * *